United States Patent
Harara et al.

[11] Patent Number: 5,975,541
[45] Date of Patent: Nov. 2, 1999

[54] STRUT-TYPE SUSPENSION APPARATUS FOR A VEHICLE

[75] Inventors: Mitsuhiko Harara; Takao Morita; Hideaki Okamoto; Tsutomu Matsukawa; Yasutomo Takeuchi; Hidekazu Suzuki, all of Tokyo, Japan

[73] Assignee: Mitsubishi Jidosha Kogyo Kabushiki Kaisha, Tokyo, Japan

[21] Appl. No.: 08/809,749

[22] PCT Filed: Jul. 22, 1996

[86] PCT No.: PCT/JP96/02050

§ 371 Date: Aug. 11, 1997

§ 102(e) Date: Aug. 11, 1997

[87] PCT Pub. No.: WO97/03852

PCT Pub. Date: Feb. 6, 1997

[30] Foreign Application Priority Data

Jul. 21, 1995 [JP] Japan .................................. 7-185974
Aug. 3, 1995 [JP] Japan .................................. 7-198854
Mar. 4, 1996 [JP] Japan .................................. 8-046303

[51] Int. Cl.[6] .................................................. B62D 17/00
[52] U.S. Cl. .............................. 280/5.524; 280/124.135
[58] Field of Search ......................... 280/5.524, 124.135, 280/124.138, 124.144, 124.15

[56] References Cited

U.S. PATENT DOCUMENTS 3,942,816  3/1976  Scherenberg et al. .......... 280/124.138
4,991,867  2/1991  Wasizu et al. .................. 280/124.144
5,098,116  3/1992  Edahiro et al. ...................... 280/5.524

FOREIGN PATENT DOCUMENTS 50-86027   7/1975  Japan .
61-50810   3/1986  Japan .
63-34210   2/1988  Japan .
63-263111 10/1988  Japan .
2-216309   8/1990  Japan .
2-270614  11/1990  Japan .
4-2441     1/1992  Japan .
5-155215   6/1993  Japan .
5-178049   7/1993  Japan .
5270221   10/1993  Japan .
6-122310   5/1994  Japan .
7-137518   5/1995  Japan .

Primary Examiner—Kenneth R. Rice

[57] ABSTRACT

A strut-type suspension apparatus for a vehicle has a lower arm composed of a lateral arm (31) and a compression arm (60). One end of the lateral arm is swingably connected to a hub carrier that supports the wheel (1), and the other end thereof is swingably connected to a vehicle body (2). One end of the compression arm is swingably connected to the lateral arm at a first junction (50, 54) at the hub-carrier-side end portion of the lateral arm, and the other end thereof is swingably connected to the vehicle body at a second junction (70) separated from the other end of the lateral arm in the longitudinal direction of the vehicle. When an external force acts on the wheel, the other end of the compression arm is displaced along a straight line connecting the first and second junctions. The suspension apparatus is compact and highly durable.

26 Claims, 22 Drawing Sheets

F I G. 18
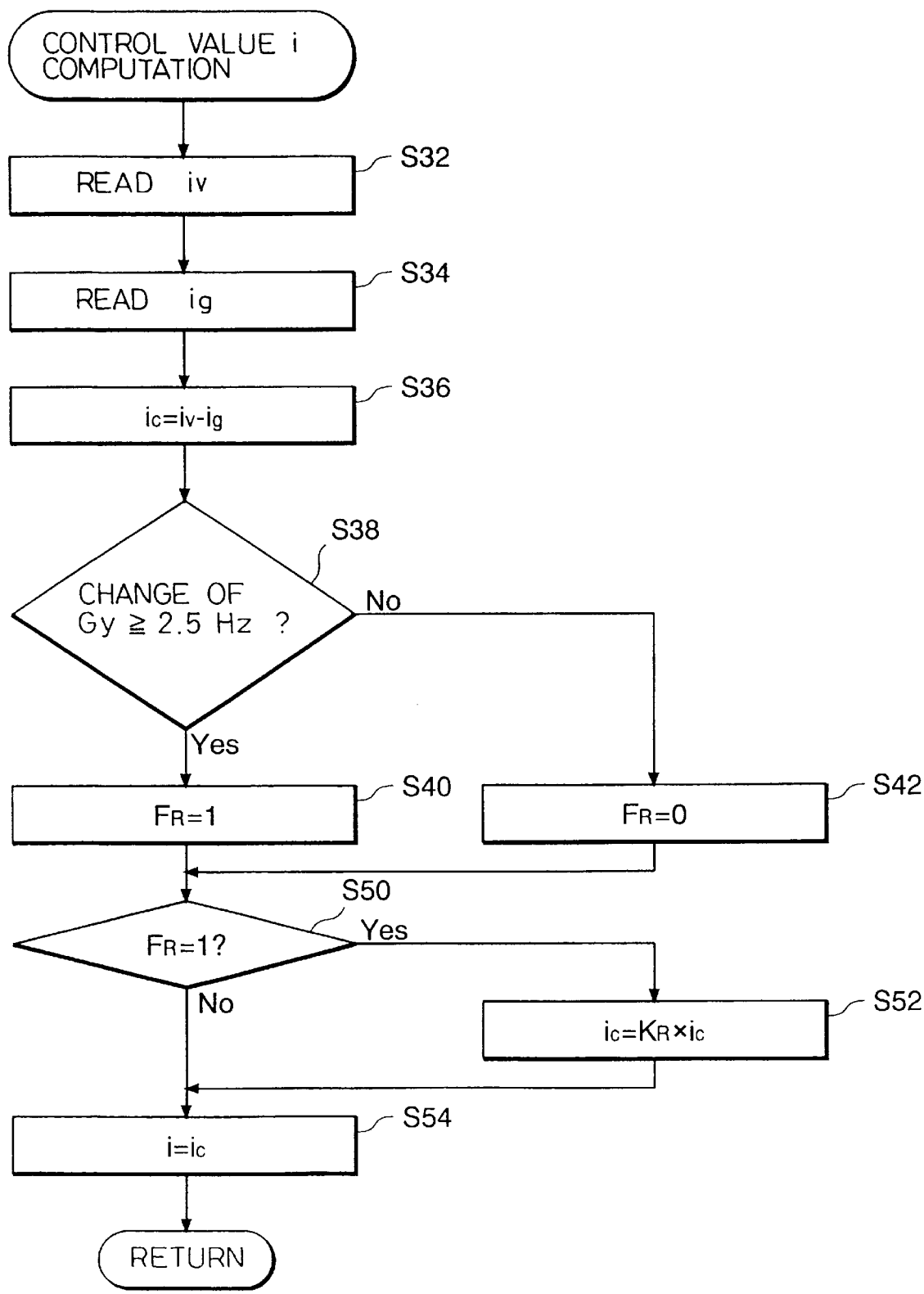

F I G. 19
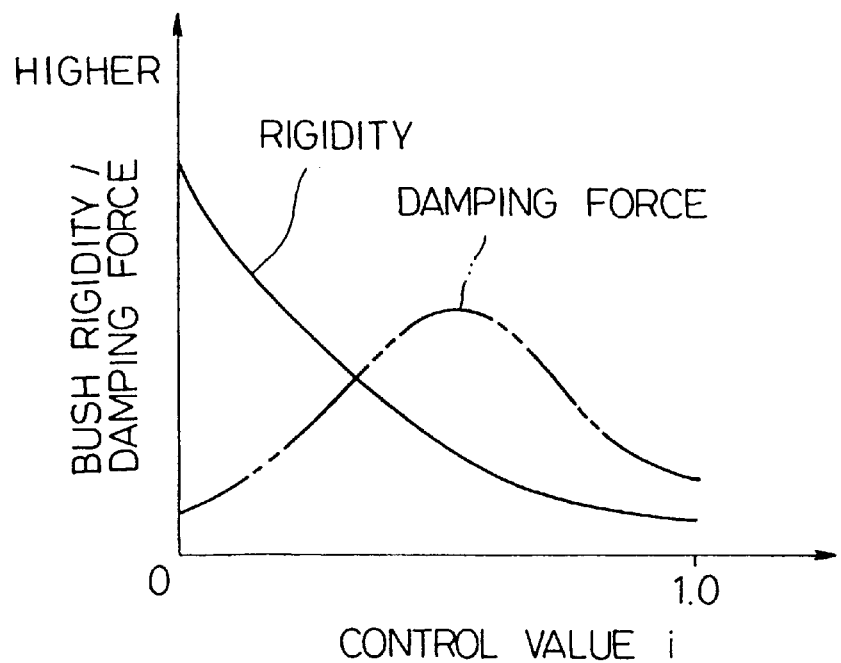
F I G. 20
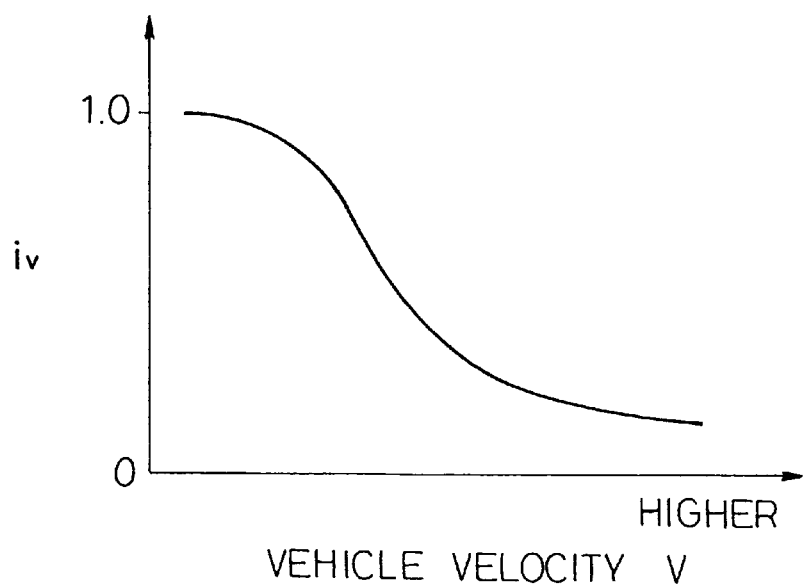

STRUT-TYPE SUSPENSION APPARATUS FOR A VEHICLE

TECHNICAL FIELD

The present invention relates to a strut-type suspension apparatus having a split-type lower arm, and more specifically, to a suspension apparatus capable of optimally maintaining rigidity between the lower arm and the body of a vehicle and optimally maintaining the wheel alignment, thereby securing the traveling stability of the vehicle at all times.

BACKGROUND ART

Nowadays, strut-type suspensions, each composed of a strut and a lower arm are frequently used as suspension apparatuses for vehicles. In general, a strut-type suspension is used for a steered wheel, taking advantage of its structural superiority, in particular. Usually, an A-shaped lower arm, composed of two integral arms is used as a lower link of the strut-type suspension of this kind. One arm of the lower arm is located on the front side in the longitudinal direction of the body of a vehicle, and extends outward from the vehicle body in the transverse direction of the vehicle body. The other arm is located on the rear side in the longitudinal direction of the vehicle body, and extends obliquely to the vehicle body from the outer end of the front arm in the transverse direction of the vehicle body. The wheel is attached to the junction (outer end of the lower arm) between the front and rear arms.

As shown in FIG. 26, front and rear junctions 205 and 206 are respectively provided at the respective inner ends, with respect to the transverse direction of the body of a vehicle, of the front and rear arms of an integral-type A-shaped lower arm 200. The rear junction 206 extends along the longitudinal axis of the vehicle body. The front junction 205 is swingably connected to a pair of brackets 203, 203 that protrude from the vehicle body 202, while the rear junction 206 is supported on the vehicle body 202 by means of a bush 207. Thus, the lower arm 200 is swingable in the vertical direction of the vehicle.

The lower arm 200 can never rotate around both the junctions 205 and 206 at a time. When an external force $F_W$ that acts in the longitudinal direction of the vehicle is applied to the wheel 201, as shown in FIG. 27, therefore, a turning moment acts on the lower arm 200, so that the lower arm 200 rotates around an imaginary pivot or imaginary center of rotation P between the junctions 205 and 206. Forces $F_{A1}$ and $F_{B1}$ that originate in this tuning moment act on the junctions 205 and 206, respectively, in the directions indicated by the arrows (vectors) in FIG. 27.

At this time, the forces $F_{A1}$ and $F_{B1}$ act obliquely to the respective axes of the front and rear arms of the lower arm 200. As for the force $F_{B1}$, in particular, the force $F_{B1}$ acts substantially at right angles to the axis of the rear junction 206, so that it acts to bend the rear arm. The pivot P of the lower arm 200 is situated inside the junctions 205 and 206 in the transverse direction of the vehicle body. In other words, an arm length concerned with the turning moment is greater than the length of the lower arm 200. Accordingly, the turning moment caused by the external force $F_W$ has a large value, and correspondingly, the forces $F_{A1}$ and $F_{B1}$ are considerably great. Thus, the lower arm 200 is subjected to a very heavy load, which is not desirable.

According to the A-shaped lower arm 200, the transmission of the external force $F_W$ to the vehicle body is eased by utilizing the deflection of the arm. If the arm is too flexible, however, the deflection of the arm becomes excessive when the external force $F_W$ increases as the vehicle turns, for example. This results in a problem that the wheel 201 becomes shaky or the alignment of the toe angle or the like changes unexpectedly, so that the traveling stability of the vehicle is lowered. If the arm is too stiff, on the other hand, the application of the external force $F_W$ causes vibration of the vehicle body.

Proposed in Jpn. Pat. Appln. KOKAI Publication No. 5-270221, etc., therefore, is a split-type A-shaped lower arm 200 that is constructed in the manner shown in FIG. 28, in order to ease the transmission of the external force $F_W$ to the vehicle body satisfactorily and give suitable magnitudes and directions to the forces $F_{A1}$ and $F_{B1}$. In FIG. 28, the lower arm 200 is composed of a front arm 210 and a rear arm 212 provided separately therefrom. The two arms 210 and 212 are swingably connected to each other. The arms 210 and 212 are connected to the vehicle body 202 at junctions 205 and 206, respectively. The front junction 205 is attached to the brackets 203, 203 of the vehicle body 202 through an elastic bush (not shown). A bush 207, interposed between the rear junction 206 and the vehicle body 202, is formed of a highly elastic material.

According to this split-type lower arm, when the external force $F_W$ acts on the wheel 201, the external force $F_W$ is absorbed satisfactorily by the elastic bushes that are interposed between the vehicle body 202 and the junctions 205 and 206, individually. When the external force $F_W$ acts on the wheel 201, moreover, the front arm 210 is subjected to a force $F_{A1}$ that acts substantially in the axial direction of the front arm. Thus, the direction of action of the force $F_{A1}$ acting on the front arm 210 is made appropriate.

Even in the split-type A-shaped lower arm 200, however, a force (corresponding to the force $F_{B1}$ in FIG. 24), acting on the rear end portion (junction 206) of the rear arm 212 when the external force $F_W$ is applied, acts substantially at right angles to the arm axis at the rear end portion of the rear arm, that is, in the direction in which the arm bends. Accordingly, it cannot be concluded that the load on the lower arm 200 is reduced very much. It is not easy, moreover, to set the rigidity of the junction 206 properly.

In the case where a joint connecting the front and rear arms 210 and 212 is provided on the axis of the front arm 210, as shown in FIG. 28, this joint easily bends when a great external force acts on the wheel 201, especially when the external force acts in the axial direction of the front arm 210, that is, in the transverse direction of the vehicle. If the joint bends, the wheel alignment changes unfavorably.

Described in Jpn. Pat. Appln. KOKAI Publication No. 5-270221 is a tie rod (not shown in FIG. 28), one end of which is connected to the wheel 201 and the other end to the steering. In association with the front arm 210, this tie rod is so designed that the wheel 201 toes out to some extent when the external force $F_W$ acts on the wheel 201 from the front of the vehicle, thereby preventing a tuck-in while the vehicle is turning or being braked. Accordingly, there is also a problem that the traveling stability of the vehicle worsens when the force $F_W$ acts on the vehicle that is traveling ordinarily.

Thus, even the technique disclosed in Jpn. Pat. Appln. KOKAI Publication No. 5-270221 cannot solve the problems described above in connection with the integral-type lower arm.

DISCLOSURE OF THE INVENTION

An object of the present invention is to provide a strut-type suspension apparatus having a split-type lower arm, capable of optimally maintaining rigidity between the lower arm and the body of a vehicle and optimally maintaining the wheel alignment, thereby securing the traveling stability of the vehicle at all times.

According to the present invention, there is provided a strut-type suspension apparatus for a vehicle in which a hub carrier for supporting a wheel is connected to the body of the vehicle through a strut and a lower arm. The suspension apparatus of the present invention comprises a lateral arm having one end thereof swingably connected to the hub carrier and another end thereof connected to the vehicle body so as to be swingable in the vertical direction of the vehicle body, and a compression arm having one end thereof swingably connected at a first junction to the lateral arm and another end thereof connected to the vehicle body at a second junction. The first junction is provided at a hub-carrier-side end portion of the lateral arm, and the second junction is separated from a vehicle-body-side junction of the lateral arm in the longitudinal direction of the vehicle body. The lower arm is composed of the lateral arm and the compression arm.

With this arrangement, when the wheel receives from the road surface an input force acting in the longitudinal direction of the vehicle body, the lateral arm is swung by this external input force. At this time, the external input force can be caused to act on the vehicle body substantially only in a direction along the compression arm via the first junction. In contrast with the case of the conventional A-shaped lower arm, therefore, the vehicle body cannot be subjected to any moment generated around an imaginary pivot, so that the input force acting on the vehicle body can be lessened as a whole, and an amount of change of the toe angle of the wheel can be reduced.

Preferably, another end of the compression arm is connected to the vehicle body through a first bush. Preferably, the first bush includes a support shaft disposed so as to be substantially perpendicular, at the second junction, to a straight line connecting the first and second junctions, an elastic body provided surrounding the support shaft, a first fluid chamber and a second fluid chamber arranged in the elastic body so as to face each other across the support shaft on the straight line and filled with a fluid, and a restriction passage through which the first and second fluid chambers are permitted to be communicated with each other. With this arrangement, the external input force acting on the vehicle body can be lessened as a whole, and the amount of change of the toe angle of the wheel can be reduced. Besides, the fluid in the first and second fluid chambers of the first bush moves from one of the two fluid chambers to the other through the restriction passage, thereby generating a damping force, so that the external input force acting on the vehicle body can be suitably damped, and the input force that acts on the vehicle body in the direction along the compression arm is absorbed satisfactorily.

Also, the first bush may further include damping force regulating means for regulating damping force by changing the restriction of the restriction passage. Thus, an optimum damping force can be obtained.

Further, the damping force regulating means may be arranged so as to change the restriction of the restriction passage in accordance with a state variable of the vehicle detected by state variable detecting means. With this arrangement, the damping force can be adjusted depending on the traveling state of the vehicle, and rigidity between the compression arm and the vehicle body can be suitably adjusted according to the situation.

Preferably, another end of the lateral arm is swingably connected to the vehicle body through an elastic second rubber bush. At least the spring constant of the second bush in the transverse direction of the vehicle may be set so as to minimize an amount of displacement of the one end of the lateral arm in the transverse direction of the vehicle caused when the lateral arm swings as a force exerting in the longitudinal direction of the vehicle acts on the wheel. With this arrangement, even though the force acting in the longitudinal direction of the vehicle exerts on the wheel, an amount of displacement of the wheel, connected to the one end of the lateral arm, in the transverse direction of the vehicle can always be kept small, so that the traveling stability of the vehicle is improved.

Preferably, the spring constant is set according to a first operational expression represented as a function of that component of the force acting in the longitudinal direction of the vehicle which is taken in the axial direction of the lateral arm and the reciprocal of an amount of that displacement of the one end of the lateral arm in the transverse direction of the vehicle which is caused when only the swinging motion of the lateral arm occurs. With this arrangement, the spring constant can be properly set, and the displacement of the wheel in the transverse direction of the vehicle can be satisfactorily restricted to a low level.

Moreover, the wheel may be a steered wheel. In this case, a tie rod which has one end thereof swingably connected to the hub carrier and another end thereof connected to the steering device side and which is adapted to steer the steered wheel as the steering device is actuated is provided in parallel with the lateral arm. Another end of the lateral arm is swingably connected to the vehicle body through an elastic second rubber bush. Also, at least the spring constant of the second bush in the transverse direction of the vehicle may be set so as to minimize a change of the toe angle of the wheel caused when the lateral arm swings as a force exerting in the longitudinal direction of the vehicle acts on the wheel. With this arrangement, in the case where the wheel is a steered wheel, the change of the toe angle of the wheel, caused when the lateral arm and the tie rod swing as the force exerting in the longitudinal direction of the vehicle acts on the wheel, can be restricted to a small value, so that the traveling stability of the vehicle is improved.

Preferably, the spring constant of the second bush in the transverse direction of the vehicle is set according to a second operational expression represented as a function of that component of the force exerting in the longitudinal direction of the vehicle which is taken in the axial direction of the lateral arm and the reciprocal of a value obtained by subtracting an amount of displacement of another end of the tie rod, caused when the tie rod is swung by an effect of the force exerting in the longitudinal direction of the vehicle, from an amount of that displacement of the one end of the lateral arm in the transverse direction of the vehicle which is caused when only the swinging motion of the lateral arm occurs. With this arrangement, the spring constant can be properly set, and the change of the toe angle of the wheel can be satisfactorily restricted to a small value.

Moreover, the wheel may be a steered wheel. In this case, a tie rod which has one end thereof swingably connected to the hub carrier and another end thereof connected to a steering device side and which is adapted to steer the steered wheel as the steering device is actuated is provided in parallel with the lateral arm. Another end of the lateral arm is swingably connected to the vehicle body through an elastic second rubber bush. Also, at least the spring constant of the second bush in the transverse direction of the vehicle is set so as to minimize that displacement of the one end of the lateral arm in the transverse direction of the vehicle which is caused when the lateral arm and the tie rod swing as a force exerting in the longitudinal direction of the vehicle acts on the wheel, and to minimize a change of the toe angle of the wheel. With this arrangement, in the case the wheel is a steered wheel and the tie rod is provided, the spring constant can be properly set, and the change of the toe angle of the wheel can be satisfactorily restricted to a small value.

Hereupon, the spring constant of the second bush in the transverse direction of the vehicle may be set at an intermediate value between a first spring constant value and a second spring constant value. The first spring constant value is calculated according to a first operational expression represented as a function of that component of the force exerting in the longitudinal direction of the vehicle which is taken in the axial direction of the lateral arm, and the reciprocal of an amount of that displacement of the one end of the lateral arm in the transverse direction of the vehicle which is caused when only the swinging motion of the lateral arm occurs. The second spring constant value is calculated according to a second operational expression represented as a function of that component of the force in the longitudinal direction of the vehicle which is taken in the axial direction of the lateral arm, and the reciprocal of a value obtained by subtracting an amount of that displacement of another end of the tie rod which is caused when the tie rod is swung by an effect of the force exerting in the longitudinal direction of the vehicle, from that displacement of the one end of the lateral arm in the transverse direction of the vehicle which is caused when only the swinging motion of the lateral arm occurs. With this arrangement, in the case where the wheel is a steered wheel, the spring constant of the elastic second bush is set so that the displacement in the transverse direction of the vehicle and the change of the toe angle of the wheel can always be restricted to small values in a well-balanced manner.

Further, another end of the compression arm may be connected to a vehicle-body side through an actuator displaceable along a straight line connecting the first and second junctions. With this arrangement, the caster angle of the wheel can be positively adjusted while suppressing the change of the toe angle up to a small amount. Also, the input force from the road surface is applied in a direction along the axis of operation of the actuator, so that load on the actuator can be reduced.

Preferably, the actuator is composed of a piston having a connecting bracket connected to the second junction, a cylinder divided into two fluid chambers by the piston, and liquid pressure supply means for reciprocating the piston by supplying and discharging a fluid to and from the two fluid chambers. With this arrangement, a satisfactory operating force can be obtained despite the compact design.

More preferably, the actuator is operable to control the liquid pressure supply means in accordance with a state variable of the vehicle detected by state variable detecting means, and adjust the caster angle of the wheel by displacing another end of the compression arm along the straight line connecting the first and second junctions.

More preferably, the state variable detecting means includes at least one of detecting means including vehicle velocity detecting means for detecting the vehicle velocity, steering angle detecting means for detecting the steering angle, lateral acceleration detecting means for detecting a lateral acceleration acting on the vehicle, and longitudinal acceleration detecting means for detecting a longitudinal acceleration acting on the vehicle. With this arrangement, the caster angle can be adjusted depending on the traveling state of the vehicle.

BRIEF DESCRIPTION OF THE DRAWINGS

FIG. 18 is a flowchart showing a control value i computation routine in FIG. 17;

FIG. 19 is a graph showing the relationship between a control value i and the rigidity and damping force of the variable-rigidity damping bush;

FIG. 20 is a graph showing the relationship between a vehicle velocity V and a control value iv;

BEST MODE OF CARRYING OUT THE INVENTION

Suspension apparatuses according to the present invention will now be described with reference to the drawings.

Figure 1:
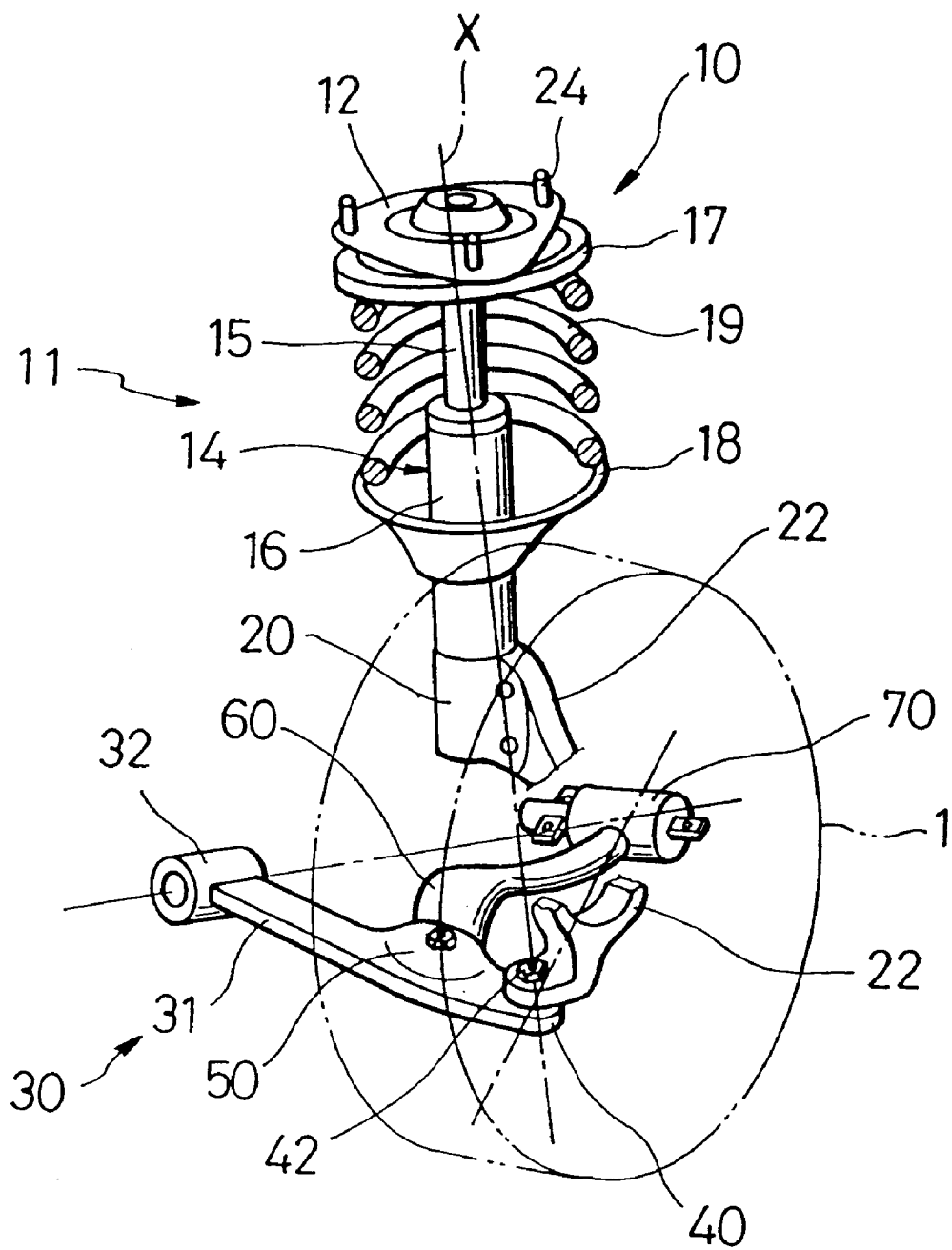
FIG. 1 is a perspective view showing a strut-type suspension applicable in common to all embodiments of the present invention.

FIG. 1 shows a strut-type suspension 10 as a suspension apparatus according to a first embodiment of the present invention. This suspension 10, which is connected to a front wheel (steered wheel) of a vehicle having two front wheels and two rear wheels, includes a strut 11 and a lower arm unit 30. In FIG. 1, symbol X designates the axis of the strut 11, that is, a kingpin axis.

The strut 11 includes a strut mount 12 fixed to the body (not shown) of the vehicle by means of bolts 24. A ball bearing (not shown) is fitted in the central portion of the strut mount 12 with a damper rubber (not shown) interposed between them. The distal end of a piston rod 15 of a shock absorber 14 is press-fitted in the inner race of the ball bearing.

A spring upper sheet 17 and a spring lower sheet 18 are fixed to the piston rod 15 and a cylinder 16, respectively, of the shock absorber 14. The spring sheets 17 and 18 are arranged facing each other and spaced apart, and a coil spring 19 is interposed in a compressed state between the spring sheets 17 and 18.

A bracket 20 is fixed to the lower end portion of the cylinder 16, and the upper end of a knuckle (hub carrier) 22 is fastened to the bracket 20 by means of fastening members. A hub (not shown) is rotatably attached to the central portion of the knuckle 22 through a ball bearing (not shown). A wheel 1 is mounted on this hub, as indicated by two-dot chain line in FIG. 1.

Figure 2:
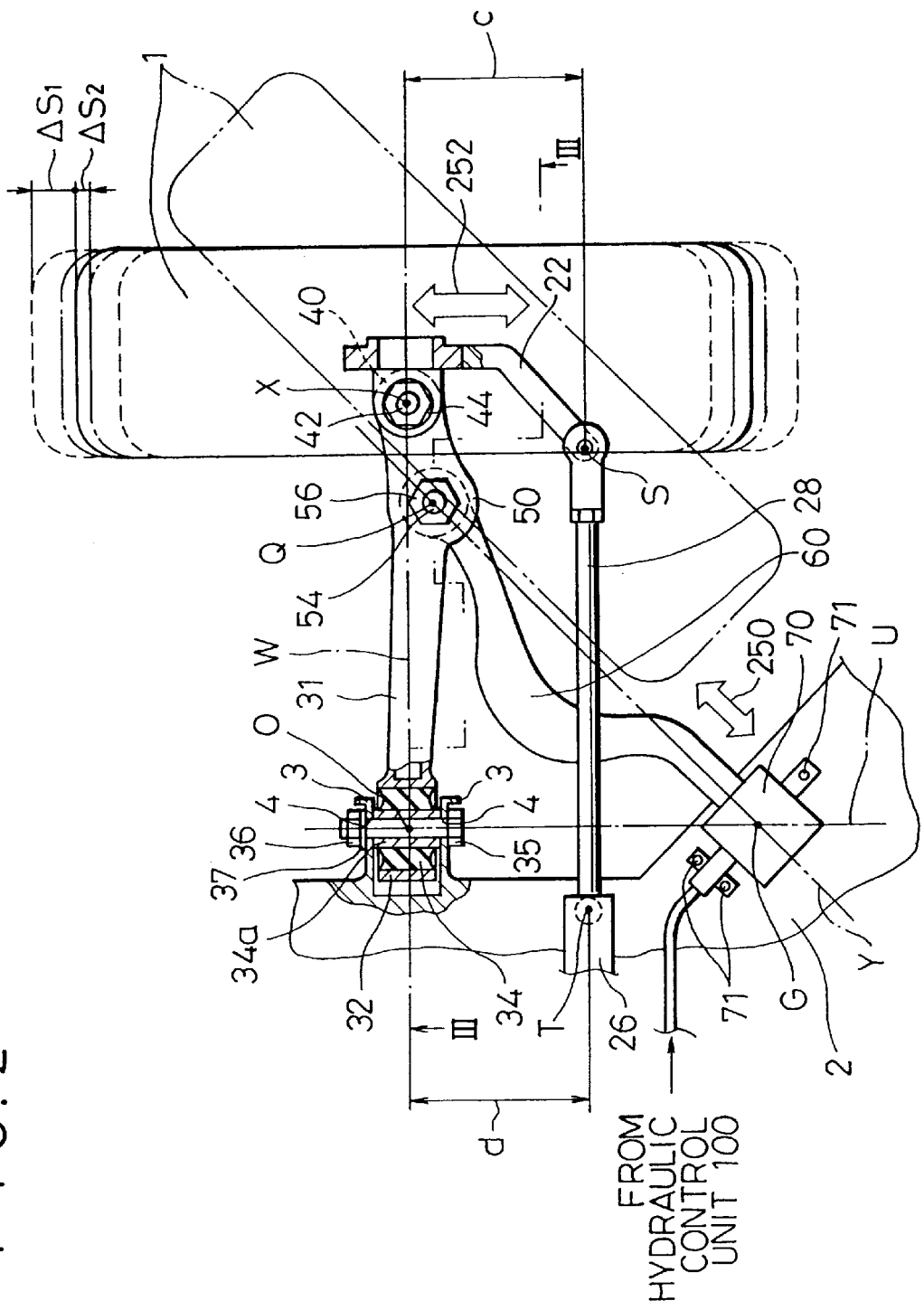
FIG. 2 is a plan view, partially in section, showing a lower arm unit of the strut-type suspension according to a first embodiment of the present invention.
Figure 3:
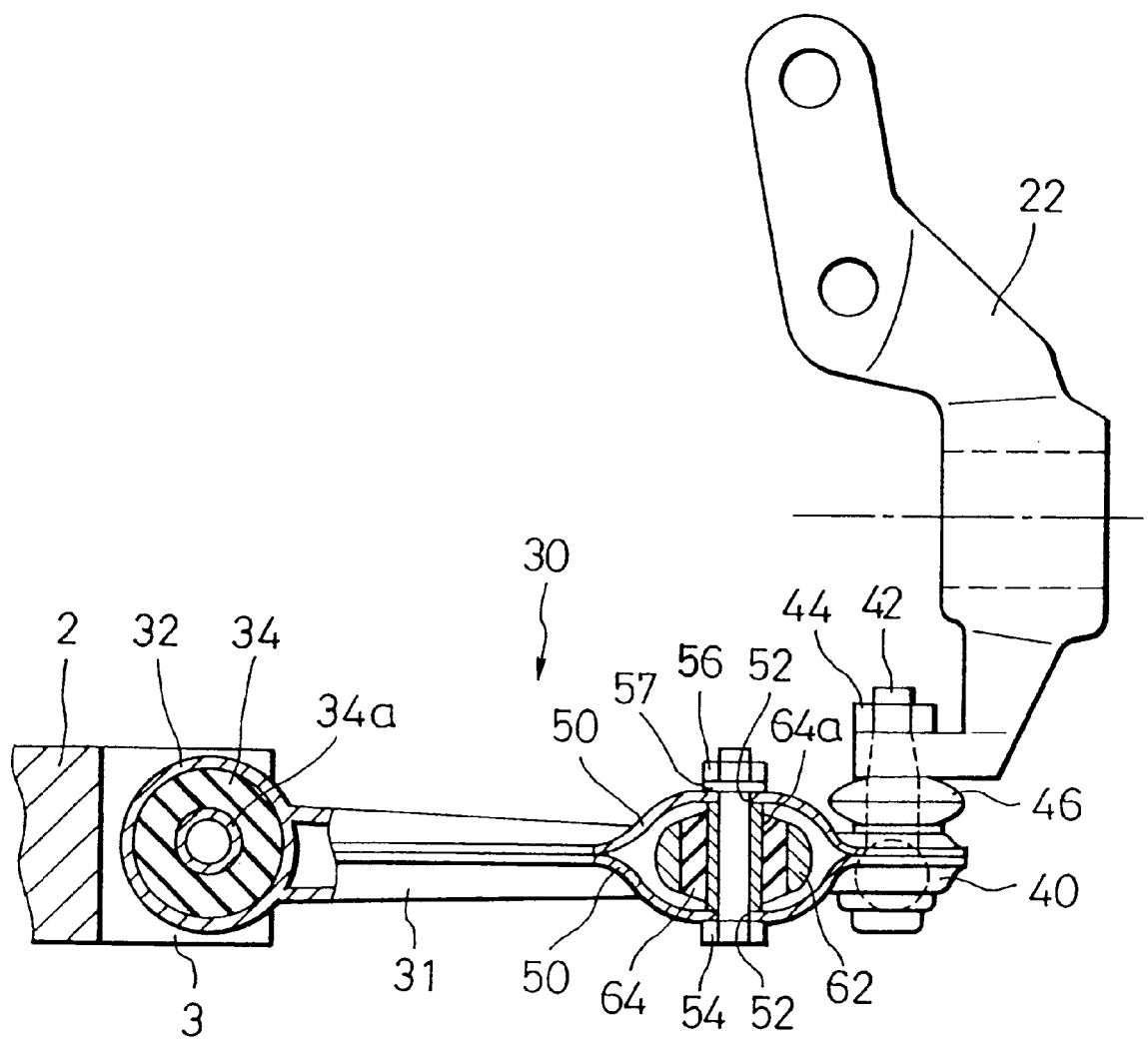
FIG. 3 is a longitudinal sectional view of the lower arm unit taken along line III—III of FIGS. 2 and 24.

Referring now to FIGS. 2 and 3, the lower arm unit 30 on the front-right-wheel side of the vehicle will be described. The lower arm unit on the front-left-wheel side is constructed in the same manner as the one on the front-right-wheel side.

As shown in FIG. 3, a knuckle junction 40 at the outer end, with respect to the transverse direction of the vehicle body, of a lateral arm 31 is provided with a universal joint or a ball joint 42. The lower end of the knuckle 22 is fastened to the distal end portion of the ball joint 42 by means of a nut 44. Thus, the presence of the ball joint 42 and the aforesaid ball bearing enables the knuckle 22 to rotate around the kingpin axis X, and the wheel 1 can be steered in the manner indicated by two-dot chain line in FIG. 2 through the medium of the knuckle 22 and a tie rod 28, which will be described in detail later.

A cover 46 is provided between the knuckle 22 and the knuckle junction 40 to surround an intermediate portion of the ball joint 42. The inside of the cover 46 is filled with a lubricant, whereby a swinging portion of the ball joint 42 is protected against dust and the like and lubricated to be able to swing satisfactorily.

Also, a ring-shaped portion 32 is provided at the inner end, with respect to the transverse direction of the vehicle body, of the lateral arm 31. The ring-shaped portion 32 is cylindrical in shape, and has therein a rubber bush (second bush) 34 disposed coaxially with the ring-shaped portion 32.

As shown in FIG. 2, a pair of plate-shaped mounting brackets 3, 3, individually having through holes 4, 4 bored therein, protrude from a member 2, which is a part of the vehicle body, so as to face the opposite end faces of the ring-shaped portion 32 and extend parallel to each other. Further, a bolt 35 penetrates the through holes 4, 4 and the rubber bush 34, whereby the lateral arm 31 is connected to the mounting brackets 3, 3 so as to be swingable around the bolt 35.

A nut 36 is screwed on the distal end portion of the bolt 35 through a washer 37. Thus, the bolt 35 is held by the mounting brackets 3, 3 without the possibility of slipping off, and the lateral arm 31 is stably supported on the member 2.

The ring-shaped portion 32 and its peripheral elements are so arranged as to eliminate gaps between both end faces of a core 34a of the rubber bush 34, which project outwardly of two open ends of the ring-shaped portion 32, and the opposite faces of the mounting brackets 3, 3. The rubber bush 34 is held without play between the mounting brackets 3, 3. Since the rubber bush 34 can be deformed, the lateral arm 31 can swing in the longitudinal direction of the vehicle around the center of rotation or pivot O located in the middle of the bolt 35, as well as around the bolt 35.

The lateral arm 31 is vertically divided into two parts, i.e., a pair of compression arm junctions 50, 50, between the intermediate portion of the arm 31 and the knuckle junction 40, as viewed in the transverse direction of the vehicle body. The outer end of a compression arm 60, that is, a ring-shaped portion 62, is disposed in a space defined by the compression arm junctions 50, 50.

A rubber bush 64 is fixedly disposed inside the ring-shaped portion 62 coaxially with the ring-shaped portion 62. Through holes 52, 52 are bored through the compression arm junctions 50, 50, individually. As shown in FIG. 2, the through holes 52, 52 (FIG. 3) are arranged so that their center (pivot Q) is situated on an extension of an axis Y of a variable-rigidity damping bush 70, which will be described in detail later. A bolt 54 penetrates these through holes 52, 52 and the rubber bush 64. The compression arm 60 is connected to the compression arm junctions 50, 50 by means of the bolt 54, so as to be swingable around the bolt 54 or the pivot Q (first connecting point).

A nut 56 is screwed on the distal end portion of the bolt 54 through a washer 57. Thus, the bolt 54 is held by the compression arm junctions 50, 50 without the possibility of slipping off, and the compression arm 60 is stably supported on the lateral arm 31.

The ring-shaped portion 62 and its peripheral elements are so arranged as to eliminate gaps between both end faces of a core 64a of the rubber bush 64, which project outwardly of two open ends of the ring-shaped portion 62, and the opposite faces of the compression arm junctions 50, 50. The rubber bush 64 is held without play between the compression arm junctions 50, 50. Since the rubber bush 64 can be deformed, however, the compression arm 60 can freely swing around the middle of the bolt 54 as well as around the bolt 35.

As shown in FIG. 2, the variable-rigidity damping bush (first bush) 70, capable of adjusting the damping force, is connected to the rear end (inner end) of the compression arm 60. The junction between the arm 60 and the bush 70 constitutes a fulcrum G. The bush 70 is fixed to the member 2 by means of fastening members 71 such as bolts. Further, the bush 70 is connected with a hydraulic control unit 100, which will be described in detail later.

In FIG. 2, symbol W designates a line that connects the kingpin axis X and the pivot O, that is, the axis of the lateral arm 31, while symbol U designates a line that connects the pivot O and the fulcrum G. When no load is applied to the lower arm unit 30, the line U extends substantially at right angles to the line W.

As shown in FIG. 2, the knuckle 22 has an arm, and the outer end of the tie rod 28 is connected to the terminal end of the arm so as to be swingable around a pivot S. The inner end of the tie rod 28 is coupled to a steering mechanism 26 for swinging motion around a pivot T. Thus, the wheel 1 can be steered in the aforementioned manner.

In FIG. 2, symbol c designates the distance between the axis W of the lateral arm 31 and the pivot S of the tie rod 28, while symbol d designates the distance between the lateral arm axis W and the pivot T of the tie rod 28. The distances c and d are set so that the distance d is not shorter than the distance c (d≧c), for example. In the case where the tie rod 28 and the lateral arm 31 are supposed to have substantially the same length, if the distance d is not shorter than the distance c, the wheel 1 toes in to some extent when a force $F_W$ exerting in the longitudinal direction of the vehicle acts on the wheel 1, so that the straight advance stability of the vehicle can be secured favorably. For convenience, in the present embodiment, the description is based mainly on the assumption that the distances d and c are equal (d=c).

Referring now to FIGS. 4 to 8, the variable-rigidity damping bush 70 will be described.

Figure 4:
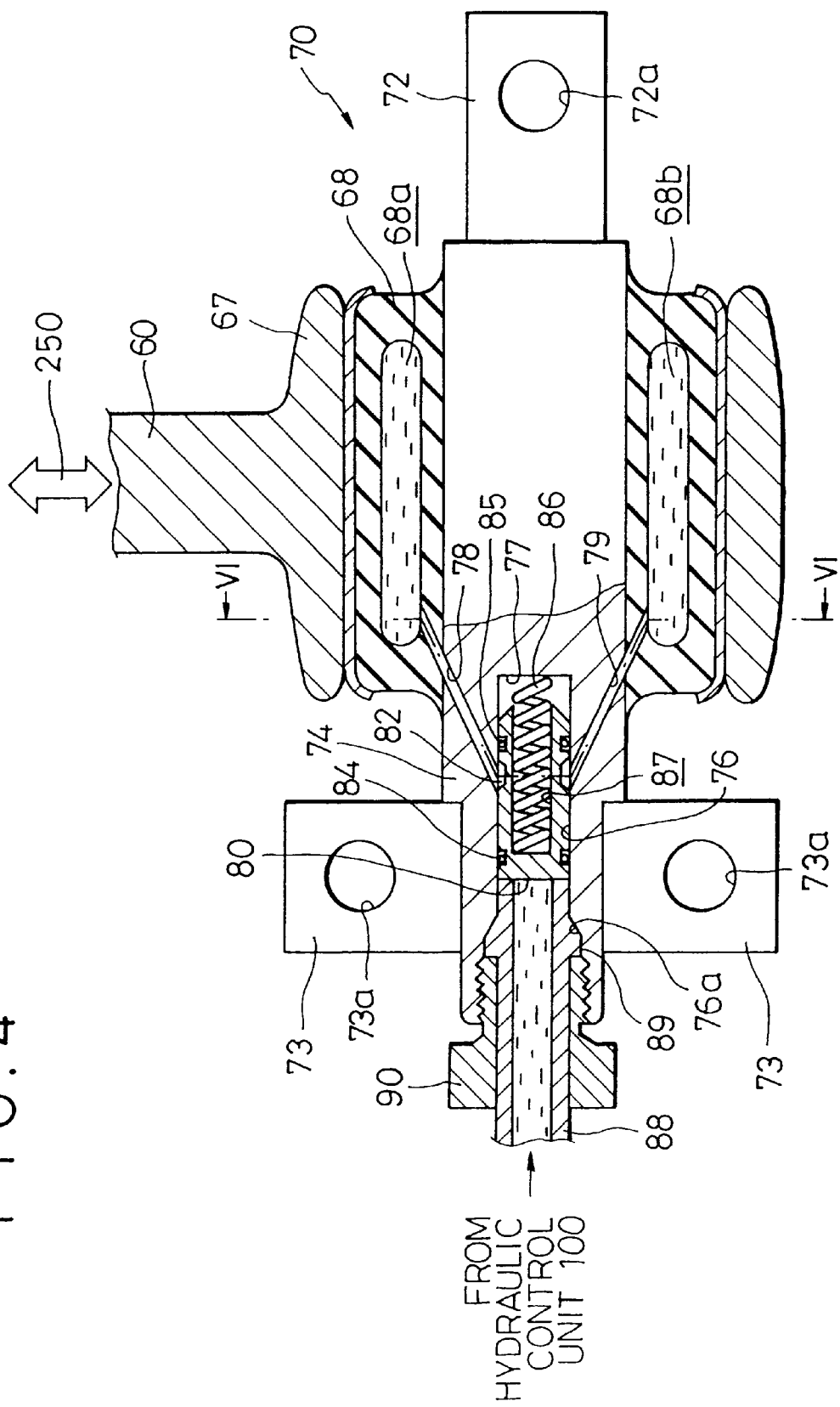
FIG. 4 is a longitudinal sectional view showing a variable-rigidity damping bush of the suspension according to the first embodiment.

As shown in FIG. 4, a ring-shaped portion 67 is formed on the rear end (inner end in the transverse direction of the vehicle body) of the compression arm 60, and the variable-rigidity damping bush 70 is fitted in the ring-shaped portion 67. More specifically, the variable-rigidity damping bush 70 is composed of a cylindrical bush body 74 and a rubber bush 68 fixed to the periphery of the bush body 74. The rubber bush 68 is press-fitted in the ring-shaped portion 67 of the compression arm 60, whereby the rubber bush 68 and hence the bush 70 are connected to the compression arm 60.

Figure 6:
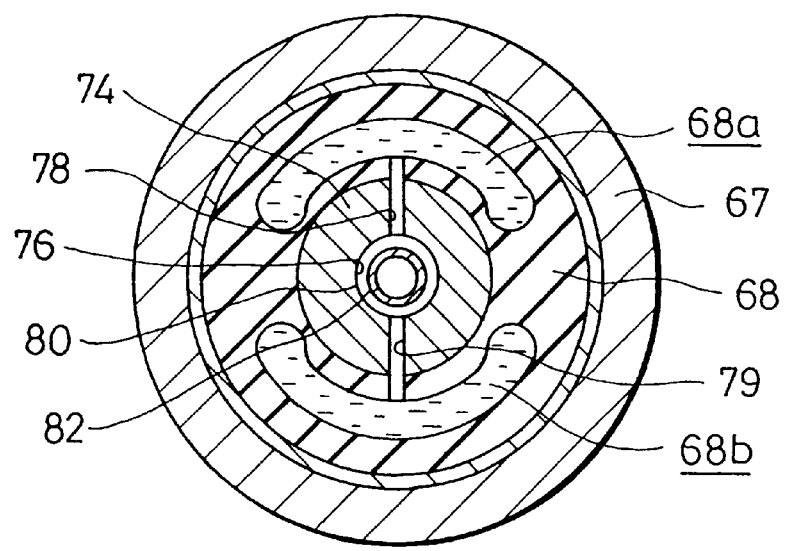
FIG. 6 is a transverse sectional view of the variable-rigidity damping bush taken along VI—VI of FIG. 4.

A liquid chamber (first fluid chamber) 68a and a liquid chamber (second fluid chamber) 68b are formed in the rubber bush 68. These two liquid chambers 68a and 68b extend along the axis of the bush body 74. More specifically, as shown in FIGS. 4 and 6, the liquid chambers 68a and 68b are arranged to face each other on an extension of the axis Y of the compression arm 60, with the bush body 74 interposed between them, and extend along the outer periphery of the bush body 74. These liquid chambers 68a and 68b are filled with hydraulic oil.

A cylinder hole 76 is bored through an end portion of the bush body 74 on the side of the hydraulic control unit 100 along the axis of the bush body 74. The cylinder hole 76 can communicate with the liquid chambers 68a and 68b by means of small-diameter liquid passages (restriction passages) 78 and 79, respectively. In other words, the liquid chambers 68a and 68b can communicate with each other through the liquid passages 78 and 79 and the cylinder hole 76.

A piston 80 is slidably inserted in the cylinder hole 76, and an annular groove 82 is formed on the outer periphery of the piston 80. Thus, the cylinder hole 76 and the piston 80 constitute a spur valve (damping force regulating means). In FIG. 4, numerals 84 and 85 individually denote piston rings that are fitted on the piston 80.

A cylindrical spring hole 87 is bored through the piston 80, and a coil spring 86 is inserted in the spring hole 87. The coil spring 86 is interposed, in a compressed state, between the piston 80 and a bottom wall 77 of the bush body 74, and urges the piston 80 in the direction away from the bottom wall 77.

One end of a high-pressure pipe 88 is inserted in the cylinder hole 76 of the bush body 74. The other end of the high-pressure pipe 88 is connected to the hydraulic control unit 100, whereby hydraulic oil (pilot pressure) is supplied through the high-pressure pipe 88 to the piston 80 disposed in the cylinder hole 76.

A stopper 89 is formed on the outer peripheral surface of the distal end portion of the high-pressure pipe 88. The high-pressure pipe 88 is fixed to the bush body 74 by inserting the high-pressure pipe 88 into the cylinder hole 76 so that the stopper 89 abuts against a step portion 76a of the cylinder hole 76, and then screwing a catch 90 fitted on the high-pressure pipe 88 into the bush body 74 so that the distal end face of the catch abuts against an opposite face of the stopper 89. Thereupon, the cylinder hole 76 is kept sealed except that it communicates with the high-pressure pipe 88.

The distal end of the high-pressure pipe 88 is designed to abut against the piston 80, whereby the piston 80 urged by the coil spring 86 is restrained from sliding toward the high-pressure pipe. When the piston 80 takes the position (original position) shown in FIG. 4, the position of the annular groove 82 of the piston 80 in the longitudinal direction of the bush and those of the openings of the liquid passages 78 and 79 are in alignment with one another. In the piston position shown in FIG. 4, therefore, the hydraulic oil can reciprocate between the liquid chambers 68a and 68b through the liquid passages 78 and 79 and the groove 82 (see FIG. 6).

The bush body 74 is provided with a flange 72 and a pair of flanges 73, 73. A through hole 72a is bored through the flange 72, while through holes 73a, 73b are bored through the flanges 73, 73, individually. As shown in FIG. 2, the fastening members 71 are penetratingly inserted in the through hole 72a and the through holes 73a, 73a, individually. As these fastening members 71 are fastened to the member 2, the variable-rigidity damping bush 70 is fixed to the member 2.

Figure 8:
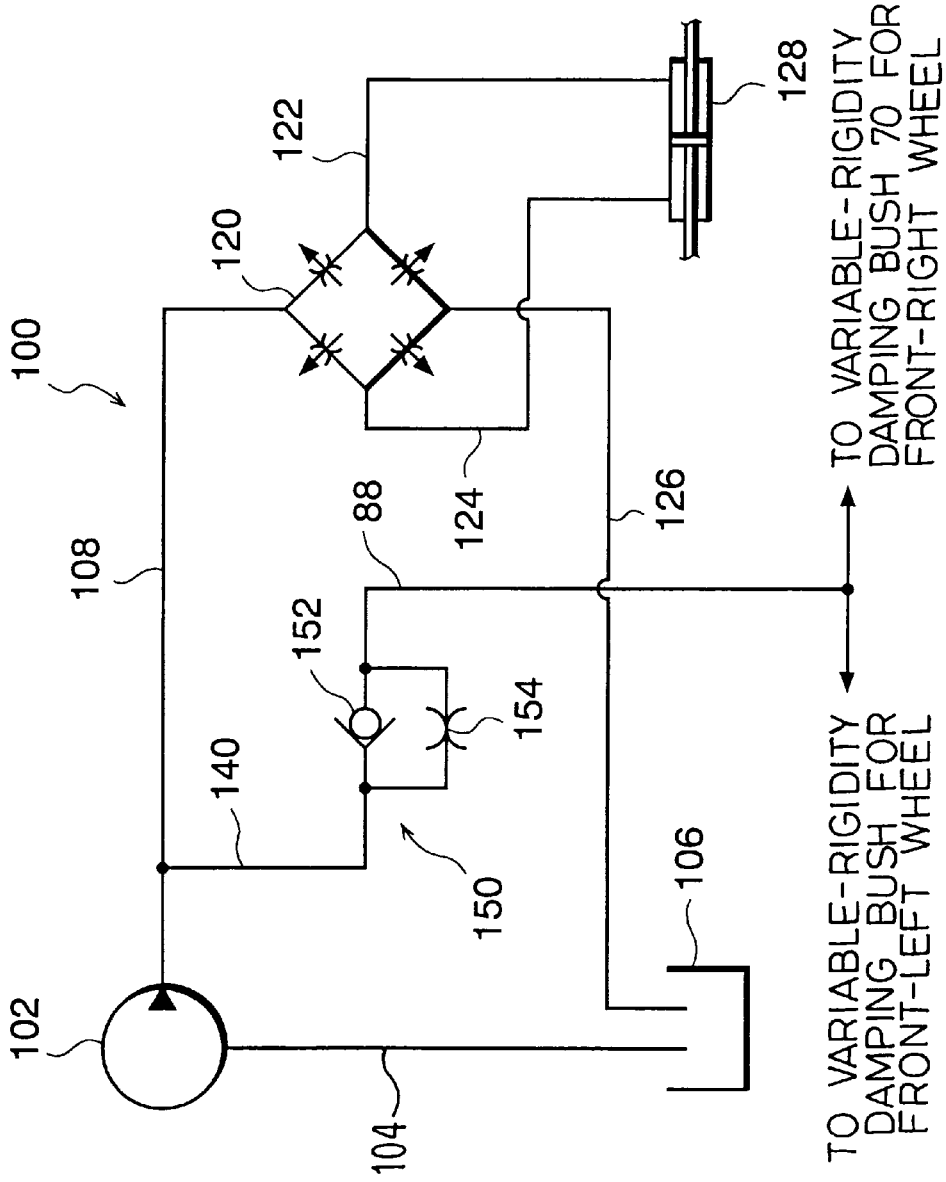
FIG. 8 is a schematic diagram showing a hydraulic control unit of the suspension according to the first embodiment.

Referring to FIG. 8, the hydraulic control unit 100, which supplies the hydraulic oil through the high-pressure pipe 88 to the piston 80 in the cylinder hole 76, includes a pump 102 for generating the oil pressure. This pump 102 is driven by an engine (not shown), and is always actuated when the engine is operating.

A line 104 is connected to the suction port of the pump 102, and extends to a drain tank 106 in which the hydraulic oil is stored. On the other hand, a line 108 is connected to the discharge port of the pump 102, and a power steering valve 120 is connected to the line 108. Lines 122 and 124 and a line 126 are connected to the power steering valve 120. The lines 122 and 124 are connected to a power cylinder 128, and the line 126 extends to the drain tank 106. The power steering valve 120 has a function of supplying liquid pressure to the power cylinder 128 through the line 122 or 124, depending on the sign (steering direction), positive or negative, of the steering angle θ, when a steering wheel (not shown) is operated so that the absolute value |θ| of a steering angle θ increases, and on the other hand, and a function of returning the hydraulic oil to the drain tank 106 directly through the line 126 when the steering wheel is not operated.

A line 140 is branched from the line 108 and is connected to the high-pressure pipe 88 through a pilot-pressure retaining unit 150.

The pilot-pressure retaining unit 150 is composed of a check valve 152 and an orifice 154 that are connected in parallel with each other. Thus, the pilot-pressure retaining unit 150 allows the hydraulic oil, flowing thereinto via the line 140, to circulate freely to the high-pressure pipe 88 when the oil pressure in the high-pressure pipe 88 is low. On the other hand, the unit guides the hydraulic oil in the high-pressure pipe 88 into only the orifice 154, while preventing the hydraulic oil from flowing back from the high-pressure pipe 88 into the line 140 by the check valve 152 when the oil pressure in the line 140 is lowered. Accordingly, this pilot-pressure retaining unit 150 serves to prevent the hydraulic oil that is once introduced into the high-pressure pipe 88 from being returned at once to the line 140, thereby maintaining the oil pressure in the high-pressure pipe 88 for some time.

The side of the high-pressure pipe 88, which is remote from the pump 102, is bifurcated, as shown in FIG. 8. One branch pipe of the high-pressure pipe 88 is connected to the variable-rigidity damping bush 70 disposed on the front-right-wheel side, while the other branch pipe is connected to a variable-rigidity damping bush (not shown) on the front-left-wheel side.

Meanwhile, the aforementioned rubber bush (second bush) 34, which is provided at the vehicle-body-side end of the lateral arm 31, has its deflection spring constant or rigidity Ka previously set at a proper value. More specifically, a rigidity $Ka_X$ in the longitudinal direction of the vehicle and a rigidity $Ka_Y$ in the transverse direction of the vehicle body are set at their respective proper values. Since the transverse rigidity $Ka_Y$ is concerned deeply with the traveling stability of the vehicle, in particular, importance is attached to the transverse rigidity than the longitudinal rigidity $Ka_X$. The following is a description of procedures for setting the transverse rigidity $Ka_Y$ of the rubber bush 34.

Consideration will now be given to the respective behaviors of the lower arm unit 30 and the wheel 1 observed when the wheel 1 is subjected to a force $F_W$ exerting in the longitudinal direction of the vehicle body in the case where the rubber bush 34 is substantially a rigid body of which the rigidity Ka is very high.

Figure 9:
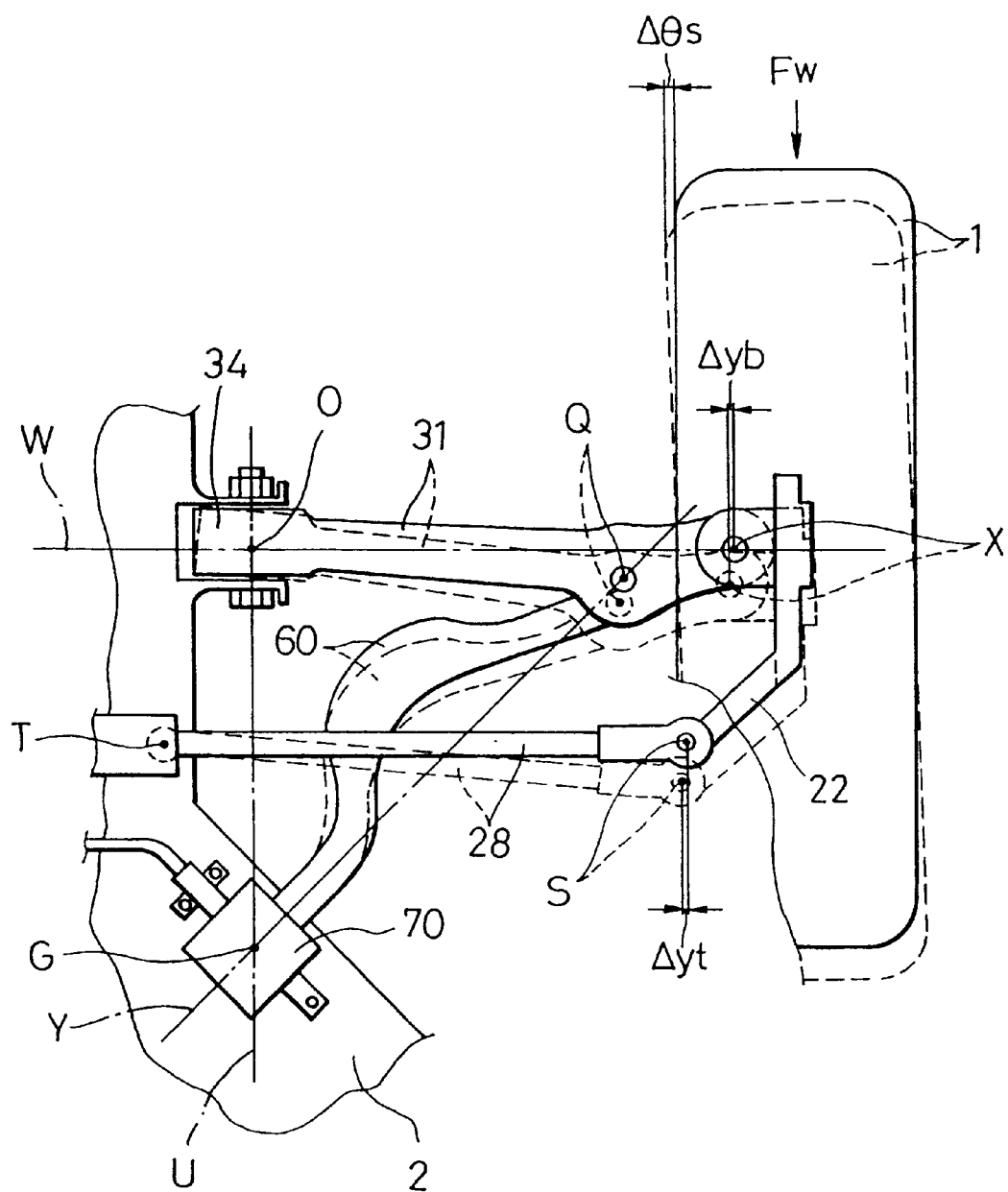
FIG. 9 is a view showing behaviors of the lower arm unit and a wheel observed when a force $F_W$ exerting in the longitudinal direction of the vehicle acts on the wheel in the case where a rubber bush interposed between a lateral arm and the vehicle body is substantially a rigid body.

When the force $F_W$ acts on the wheel 1, the lateral arm 31 is displaced to a broken-line position, as shown in FIG. 9. Since the rubber bush 34 is substantially a rigid body during this displacement, the lateral arm 31 swings around the pivot O while maintaining the distance between the pivot O and the kingpin axis X unchanged. As this is done, the compression arm 60 swings around the pivot Q and is displaced to a broken-line position while pushing the rubber bush 68 of the variable-rigidity damping bush 70. As the lateral arm 31 is displaced, the knuckle 22 mounted on the arm 31 is displaced. As the knuckle 22 is displaced, the tie rod 28 swings around the pivot T to reach a broken-line position.

As described with reference to FIG. 2, the distance d between the line W and the pivot T is set to be equal to or longer than the distance c between the line W and the pivot S. The distance between the pivot O of the lateral arm 31 and the kingpin axis X is not necessarily equal to the distance between the pivot T of the tie rod 28 and the pivot S. In the present embodiment, the distance between the pivots T and S is set to be a little longer than the distance between the pivot O and the kingpin axis X. Thus, the lateral arm 31 and the tie rod 28 do have a function of parallel link.

If attention is given to that component of displacement which is taken in the transverse direction of the vehicle body, therefore, the kingpin axis X is displaced toward the vehicle body 2 by an amount Δyb as the lateral arm 31 swings around the pivot O, while the pivot S is displaced in the same direction as the kingpin axis X by an amount Δyt smaller than the displacement Δyb while the tie rod 28 swings around the pivot T. Accordingly, the knuckle 22, which is provided between the kingpin axis X and the pivot S, swings slightly in the counterclockwise direction of FIG. 9 around the kingpin axis X as it is displaced to a broken-line position. As this is done, the wheel 1 also swings in the counterclockwise direction around the kingpin axis X. Thus, in this case, the wheel 1 is shifted by the amount Δyb toward the vehicle body 2, and at the same time, its toe angle also changes by an amount Δθs, as indicated by broken line. Thus, when the wheel 1 is subjected to the force $F_W$ exerting in the longitudinal direction of the vehicle body, as mentioned before, it is caused to toe in to some extent.

In order to secure satisfactory traveling stability of the vehicle, however, it is not advisable to cause the toe angle of the wheel 1 to change as well as to change the transverse position of the wheel 1, even though the change is one on the toe-in side. According to the present embodiment, therefore, a transverse rigidity Kay of the rubber bush 34 which can permit both the transverse displacement of the wheel 1 and the change of the steering angle to be minimized satisfactorily is set experimentally.

Figure 10:
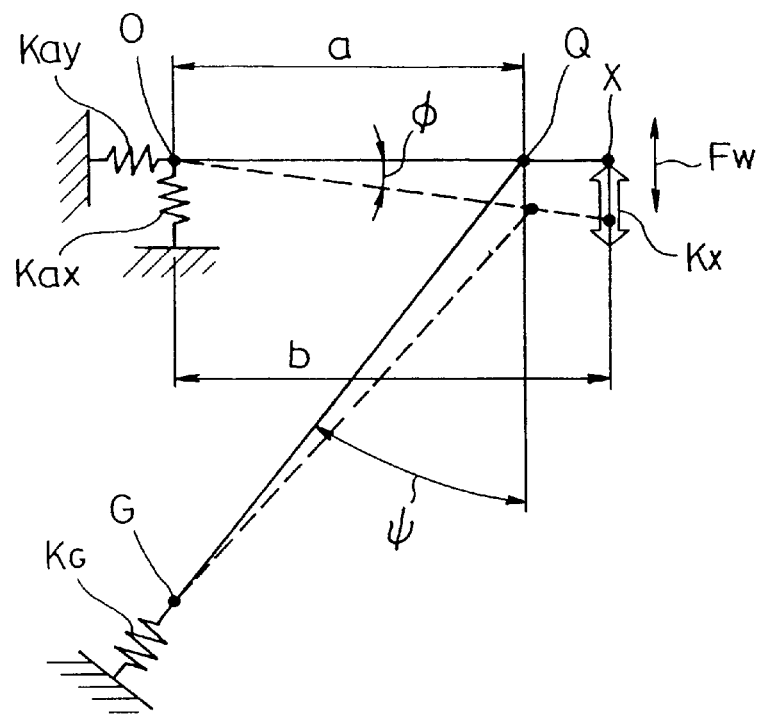
FIG. 10 is a diagram for illustrating a model of the action of the lower arm unit.

FIG. 10 shows a model of the lower arm unit 30. Referring to FIG. 10, the procedures for setting the rubber bush transverse rigidity $Ka_Y$ for the minimization of the change (displacement amount Δy) of the transverse position of the wheel 1 will be described.

In FIG. 10, the blank arrow represents a longitudinal rigidity $K_X$ of the entirety of the lower arm unit 30. First, this longitudinal rigidity $K_X$ is calculated according to equation (1) as follows:

$$K_X = K_G \cdot \cos^2\psi / L^2, \tag{1}$$

where $K_G$ is the spring constant or rigidity of the variable-rigidity damping bush 70 at the fulcrum G in the axial direction of the compression arm 60, ψ is the angle of the compression arm 60 to the wheel 1, and L is the ratio (L=b/a) between a distance a from the pivot O to the pivot Q and a distance b from the pivot O to the kingpin axis X in the case where the force $F_W$ is not applied to the wheel 1.

To prevent the displacement of the kingpin axis X in the transverse direction when the lateral arm 31 swings under the condition that the force $F_W$ acts in the longitudinal direction of the vehicle to place the lower arm unit 30 in the state indicated by broken line in FIG. 10, the rubber bush 34 may be deformed, upon occurrence of swinging motion of the lateral arm 31, in the direction opposite to the kingpin axis displacement by an amount Δyf (Δyf=$F_W$·L·tanψ/$Ka_Y$) equivalent to the displacement amount Δyb (FIG. 9) of the kingpin axis X, to cancel the displacement amount Δyb of the kingpin axis X by the transverse deformation Δyf of the rubber bush 34 (Δyf=Δyb). Thereupon, the transverse displacement amount of the wheel 1 represented by the difference between the kingpin axis displacement amount Δyb and the rubber bush deformation Δyf becomes zero. The rubber bush rigidity $Ka_Y$ to reduce the amount of transverse change of the wheel to zero is given by the following equation (first operational expression) (2) that is obtained by transforming the aforesaid equation (1), and the rigidity $Ka_Y$ is calculated according to this equation (2).

$$Ka_Y = F_W \cdot L \cdot \tan\psi / \Delta yb = F_W \cdot L \cdot \tan\psi / b \cdot (1/\cos\phi - 1), \quad (2)$$

where φ is easily calculated using the aforesaid $K_X$ according to equation (3) as follows:

$$\phi = F_W / K_X \cdot b \quad (3)$$

In this manner, the rigidity Kay that can minimize the change of the transverse position of the wheel 1, that is, displacement Δy, is obtained. If the junction S between the knuckle 22 and the tie rod 28 is displaced in the transverse direction, however, the knuckle 22 swings around the kingpin axis X through an angle equivalent to the displacement amount Δyt of the junction S, so that the wheel 1 tends to toe in with the steering angle changed, as indicated by broken line in FIG. 9. In order to prevent this change of the steering angle (toe angle) perfectly, it is necessary to shift the kingpin axis X in the transverse direction by an amount equivalent to the transverse displacement amount Δyt of the junction S between the tie rod 28 and the knuckle 22.

In the present embodiment, therefore, the proper rigidity $Ka_Y$ is obtained according to the following equation (second operational expression) (4), taking account of the transverse displacement amount Δyt of the junction S between the tie rod 28 and the knuckle 22.

$$Ka_Y = F_W \cdot L \cdot \tan\psi / (\Delta yb - \Delta yt) = F_W \cdot L \cdot \tan\psi / \{b \cdot (1/\cos\psi - 1) - \Delta yt\}, \quad (4)$$

where the term Δyb−Δyt represents a necessary transverse displacement amount Δyb' of the kingpin axis X to decrease the steering angle change to a minimum, in the case where the junction between the tie rod 28 and the knuckle 22 is displaced in the transverse direction of the vehicle body by the amount Δyt, for the minimization of the steering angle change. According to the present embodiment, the value of this displacement amount Δyb' (=Δyb−Δyt) is smaller than that of the displacement amount Δyb (Δyb'<Δyb). Thus, the value of the rubber bush rigidity $Ka_Y$, which is calculated according to the aforesaid equation (4) to minimize the steering angle change, is larger than the value obtained according to equation (2) to minimize the transverse displacement amount Δy of the wheel 1 simply. Accordingly, the transverse rigidity $Ka_Y$ of the rubber bush 34 is set to be relatively large so that the bush is somewhat hard.

In this manner, the transverse rigidity $Ka_Y$ of the rubber bush 34 is suitably set with good balance in consideration of the change of the transverse position of the wheel 1 and the steering angle change, so that the wheel 1 is prevented from shifting in the transverse direction when it is subjected to the force $F_W$, and the toe angle of the wheel 1 is prevented from changing. Thus, the traveling stability of the vehicle can be secured satisfactorily.

The rigidity $K_G$ of the variable-rigidity damping bush 70 changes in accordance with damping force regulation. Actually, therefore, an optimum rigidity $Ka_Y$ is selected and set on the basis of the rigidity $K_G$ that changes.

Figure 11:
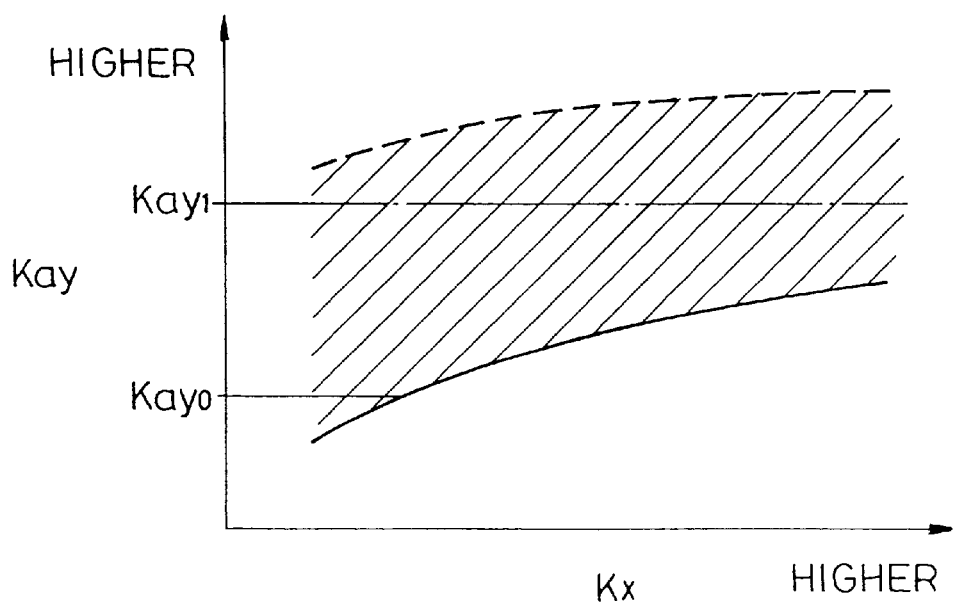
FIG. 11 is a view showing a set allowable range of the spring constant of the rubber bush in the transverse direction of the vehicle, that is, rigidity $Ka_y$.

Referring to FIG. 11, there is shown the relationship between the longitudinal rigidity $K_X$ of the whole lower arm unit 30 and the transverse rigidity $Ka_Y$ of the rubber bush 34. In other words, FIG. 11 shows the change of the rubber bush rigidity $Ka_Y$ compared to the rigidity $K_G$ of the variable-rigidity damping bush 70. In FIG. 11, the solid line represents the rigidity $Ka_Y$ that is set to prevent only the transverse displacement (Δy) of the wheel 1, while the broken line represents the rigidity $Ka_Y$ that is set more properly so that the steering angle change (Δθs) can be prevented, in consideration of the displacement amount Δyt of the junction S between the tie rod 28 and the knuckle 22.

Generally, the transverse rigidity $Ka_Y$ of the rubber bush 34 has a characteristic such that it becomes higher with the increase of the longitudinal rigidity $K_X$ of the lower arm unit 30, as shown in FIG. 11. Thus, in the case where the rigidity $Ka_Y$ is set at, e.g., a value $Ka_Y0$ on the solid line in FIG. 11, the rubber bush 34 having the rigidity $Ka_Y0$ cannot exhibit a satisfactory elastic force when the longitudinal rigidity $K_X$ of the lower arm unit 30 increases. As a result, the traveling stability of the vehicle is ruined by an unexpected substantial change of the toe angle or the like.

Accordingly, the transverse rigidity $Ka_Y$ of the rubber bush 34 is set at a value (e.g., $Ka_{Y1}$) within a range (indicated by hatching) defined between the full and broken lines in FIG. 11, to ensure that the transverse position change (Δy) and the steering angle change (Δθs) fall within allowable ranges.

Although a description of the longitudinal rigidity $Ka_X$ of the rubber bush 34 is omitted, this rigidity $Ka_X$ may be suitably set in association with the longitudinal rigidity $K_X$ of the entire lower arm unit 30.

The following is a description of operation of the strut-type suspension 10 constructed in this manner. The description to follow will be given for two cases, a case in which the steering wheel is not operated so that the absolute value |θ| of the steering angle θ is smaller than a predetermined value $θ_1$ in the vicinity of zero ($0 \leq |θ| < θ_1$) and a case in which the steering wheel is operated so that the absolute value $|θ_1|$ of the steering angle θ is equal to or larger than the predetermined value $θ_1$ ($|θ| \geq θ_1$). Although the description to follow is concerned with the operation on the front-right-wheel side, the same operation is performed on the front-left-wheel side.

|θ| is nearly zero ($0 \leq |θ| < θ_1$):

When the steering wheel is not operated so that the absolute value |θ| of the steering angle θ is in the vicinity of zero ($0 \leq |θ| < θ_1$), the hydraulic oil discharged from the pump 102, in the hydraulic control unit 100 shown in FIG. 8, flows back into the drain tank 106 through the line 108, power steering valve 120, and line 126. The hydraulic oil is supplied to the variable-rigidity damping bush 70 through the line 140 and the check valve 152.

At this point of time, the oil pressure in the line 108 is not very high. Therefore, the oil pressure (state variable of the vehicle) supplied to the variable-rigidity damping bush 70 is lowered correspondingly. In this case, although the pilot pressure acts on the piston 80 received in the variable-rigidity damping bush 70, it is not high enough to resist the urging force of the coil spring 86. Accordingly, the piston 80 is kept in the position where it engages the distal end of the high-pressure pipe 88, that is, the original position shown in FIG. 4.

When the piston 80 is in the original position, the position of the groove 82 of the piston 80 and the respective positions of the openings of the liquid passages 78 and 79 are in alignment with one another, so that the hydraulic oil is allowed to reciprocate between the liquid chambers 68a and 68b through the liquid passages 78 and 79. In this case, if there is an input force acting on the variable-rigidity damping bush 70 which exerts in the axial direction of the compression arm 60, as indicated by a blank arrow 250 in FIG. 4, the hydraulic oil reciprocates between the liquid chambers 68a and 68b through the liquid passages 78 and 79 and the groove 82.

Thereupon, when the hydraulic oil reciprocates between the liquid chambers 68a and 68b through the liquid passages 78 and 79, a damping force is generated against the input force, corresponding to a frictional force generated as the hydraulic oil flows in the liquid passages 78 and 79. This damping force, which is settled depending on the sectional area of the liquid passages 78 and 79, is relatively small. In this case, therefore, the variable-rigidity damping bush 70 absorbs the input force from the compression arm 60 slowly and fully while allowing the compression arm 60 to be displaced.

Thus, in response to the displacement of the compression arm 60, the wheel 1 is displaced considerably by an amount ΔS1 in the direction indicated by a blank arrow 252 in FIG. 2, thereby reaching the position indicated by the broken line. On the other hand, the input force is satisfactorily absorbed and ceases to be transmitted to the vehicle body side, so that passengers of the vehicle can enjoy a good ride without feeling uncomfortable.

|θ| is equal to or larger than the predetermined value $\theta_1$ (|θ|≧$\theta_1$):

When the steering wheel is so operated that the absolute value |θ| of the steering angle θ is equal to or greater than the predetermined value $\theta_1$ (|θ|≧$\theta_1$), the power steering valve 120 is actuated, whereupon the circulation of the hydraulic oil to the line 126 is interrupted in the hydraulic control unit 100, while the circulation of the hydraulic oil to the line 122 or 124 is allowed. As a result, the hydraulic oil discharged from the pump 102 into the line 108 flows through the line 122 or 124, depending on the positiveness or negativeness of the steering angle θ, and actuates the power cylinder 128.

As this is done, the hydraulic oil is also supplied to the variable-rigidity damping bush 70 through the line 140 and the check valve 152. Since the circulation of the hydraulic oil to the line 126 is interrupted in this case, the oil pressure in the line 108 is increased, so that the high-pressure hydraulic oil is supplied to the variable-rigidity damping bush 70 via the high-pressure pipe 88. Thus, the piston 80 received in the variable-rigidity damping bush 70 is pushed toward the bottom wall 77 by means of a high pilot pressure, resisting the urging force of the coil spring 86.

Figure 5:
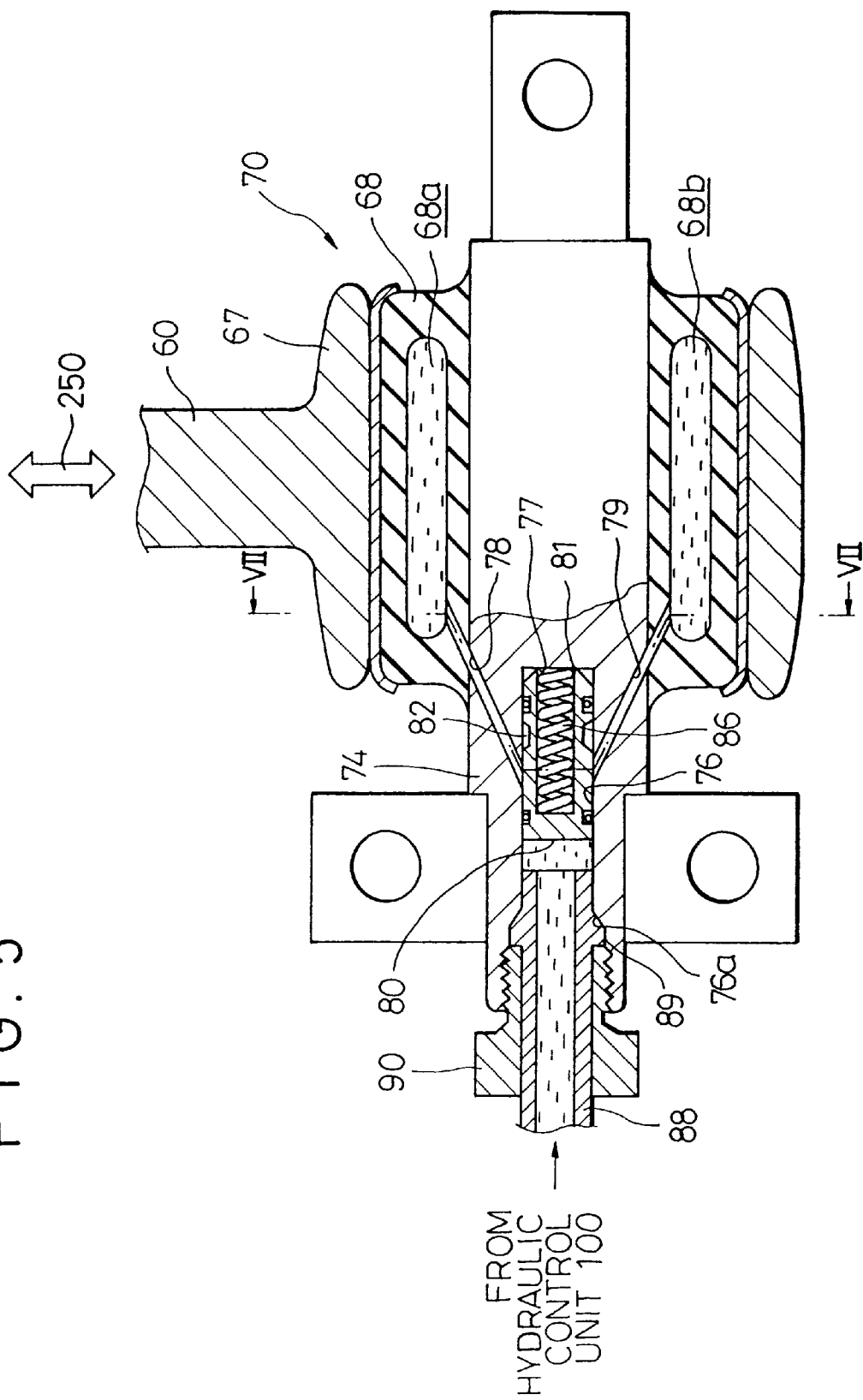
FIG. 5 is a view showing a state in which a piston of the variable-rigidity damping bush in FIG. 4 is moved.
Figure 7:
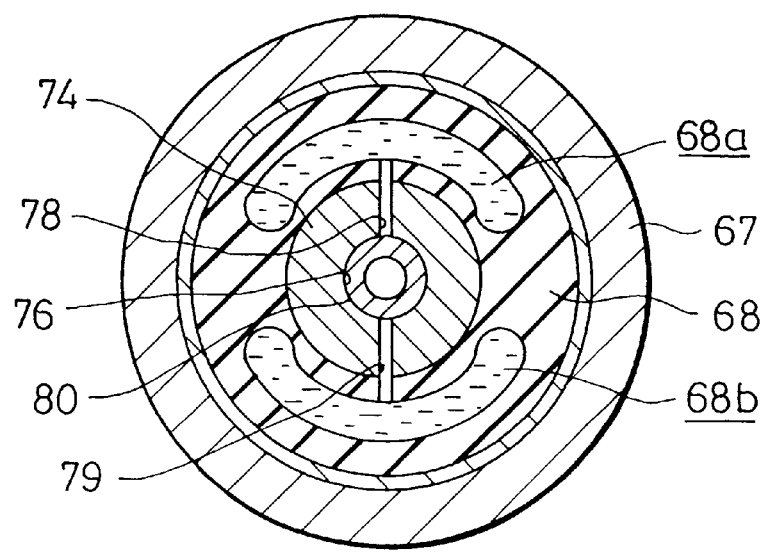
FIG. 7 is a transverse sectional view of the variable-rigidity damping bush taken along VII—VII of FIG. 5.

FIG. 5 shows the variable-rigidity damping bush 70 with the piston 80 urged by the high pilot pressure, and FIG. 7 shows a section along line VII-VII of FIG. 5. When the piston 80 is urged by means of the high pilot pressure, as shown in FIGS. 5 and 7, the piston 80 is moved to a position at which its distal end 81 abuts against the bottom wall 77 of the bush body 74. At this time, the position of the groove 82 of the piston 80 is offset from the respective positions of the openings of the liquid passages 78 and 79, so that the circulation of the hydraulic oil between the liquid passages 78 and 79, that is, between the liquid chambers 68a and 68b, is interrupted.

In this case, even if an input force, such as the one indicated by the blank arrow 250 in FIG. 5, acts on the variable-rigidity damping bush 70 through the compression arm 60, the hydraulic oil never reciprocates between the liquid chambers 68a and 68b, so that the rigidity of the variable-rigidity damping bush 70 is high.

Thus, in this case, the compression arm 60 is displaced by means of the elasticity of the rubber bush 68 only, so that the wheel 1 can shift only up to the position indicated by one-dotted chain line at the utmost, in the direction by the blank arrow 252 in FIG. 2, and its displacement amount is as small as ΔS2 or thereabout. If the displacement amount of the wheel 1 is small, a turning force or cornering force securely acts on the vehicle, so that appropriate turning corresponding to the operation of the steering wheel can be effected.

In the case where the discharge pressure of the pump 102 is low, the pilot pressure is also relatively low. In this case, the amount of movement of the piston 80 is small, and some circulation of the hydraulic oil between the liquid chambers 68a and 68b is allowed. When the vehicle is traveling on a low-μroad (slippery road), therefore, the discharge pressure of the pump 102 is ordinarily low. In such a case, the rigidity and the damping performance are well-balanced, so that the wheel 1 can be suitably prevented from slipping.

After the steering wheel is once so operated that the absolute value |θ| of the steering angle θ becomes equal to or greater than the predetermined value $\theta_1$, if the steering wheel is operated toward the neutral position, then the absolute value |θ| of the steering angle θ becomes smaller than the predetermined value $\theta_1$ again (0≦|θ|<$\theta_1$). Thereupon, the power steering valve 120 is switched again to its neutral operating position. The hydraulic oil flows back to the drain tank 106 through the line 126, and the oil pressure in the line 108 lowers. As a result, the oil pressure in the line 108 becomes lower than the oil pressure in the high-pressure pipe 88, so that the check valve 152 in the pilot-pressure retaining unit 150 is closed. Whereupon the hydraulic oil in the high-pressure pipe 88 is returned to the line 108 through the orifice 154 only.

Since the orifice 154 serves to restrict the flow rate, as mentioned before, the hydraulic oil in the high-pressure pipe 88 is gradually (slowly) returned to the line 108 via the orifice 154. Even in the case where the steering wheel is operated toward the neutral position, therefore, the hydraulic oil in the high-pressure pipe 88 is kept at high pressure for a while, so that the variable-rigidity damping bush 70 is kept in a high-rigidity state. Thus, in slaloming or any other operation state such that the steering wheel is frequently operated to vary the steering angle θ above and below zero, thereby continuing the turning, the rigidity of the variable-rigidity damping bush 70 is kept high, and the turning performance of the vehicle can be maintained satisfactorily.

Figure 22:
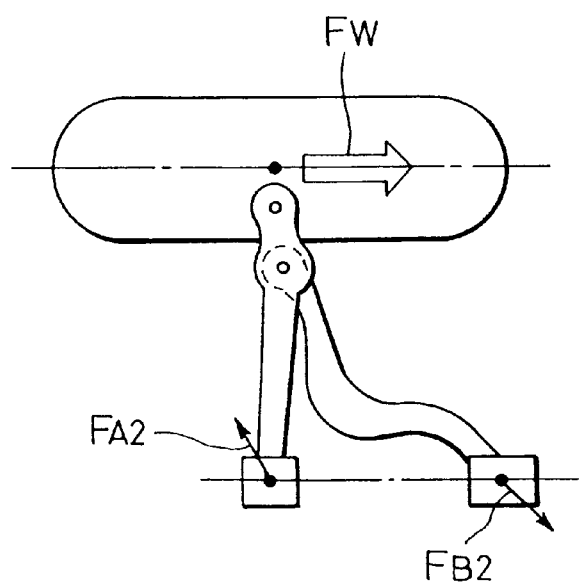
FIG. 22 is a diagram showing a component force $F_{A2}$ on the lateral-arm side and a component force $F_{B2}$ on the compression-arm side, caused to act on the vehicle body by the input force $F_W$ applied to the wheel.

FIG. 22 is a vector representation of the force $F_W$ input from the road surface and acting on the wheel 1, which force is decomposed into a force $F_{A2}$ acting on the junction (pivot O) between the lateral arm 31 and the vehicle body and a force $F_{B2}$ acting on the junction (fulcrum G) between the compression arm 60 and the vehicle body. As apparent from FIG. 22, in the case of the lower arm composed of the lateral arm 31 and the compression arm 60, the force $F_{A2}$ differs in direction and is smaller in magnitude as compared to that of the conventional A-shaped lower arm 27, and the force $F_{B2}$ is completely in line with the axial direction of the compression arm 60 and is smaller in magnitude. Thus, in this suspension apparatus of the present invention having the lateral arm 31 and the compression arm 60, which are divided and pivotably connected to each other, the lower arm can be protected against unreasonable load, so that the durability of the lower arm unit 30 can be improved.

According to the present embodiment, as described above, the rigidity $Ka_Y$ of the rubber bush 34 of the lateral arm 31 in the transverse direction of the vehicle is set at a proper rigidity value such that the transverse displacement (Δy) and steering angle change ($\Delta\theta_s$) of the wheel 1 can be minimized in a well-balanced manner. Even in the case where the force $F_W$ acts on the wheel 1 while the vehicle is traveling, therefore, the transverse position and toe angle of the wheel 1 hardly changes, as indicated by broken line or one-dotted chain line in FIG. 2. Thus, the suspension apparatus of the present invention can suitably maintain the traveling stability of the vehicle.

The following is a description of a suspension apparatus according to a second embodiment of the present invention.

In this second embodiment, only the variable-rigidity damping bush 70 for the front-right wheel and the variable-rigidity damping bush for the front-left wheel are replaced with a variable-rigidity damping bush 170 and another variable-rigidity damping bush that are different from the bushes for the first embodiment, among the components of the strut-type suspension 10 described in connection with the first embodiment. A description of component parts common to this embodiment and the first embodiment is omitted herein. The construction and function of the variable-rigidity damping bush 170 for the right-wheel side will be described in the main with reference to FIGS. 12 to 21.

Figure 12:
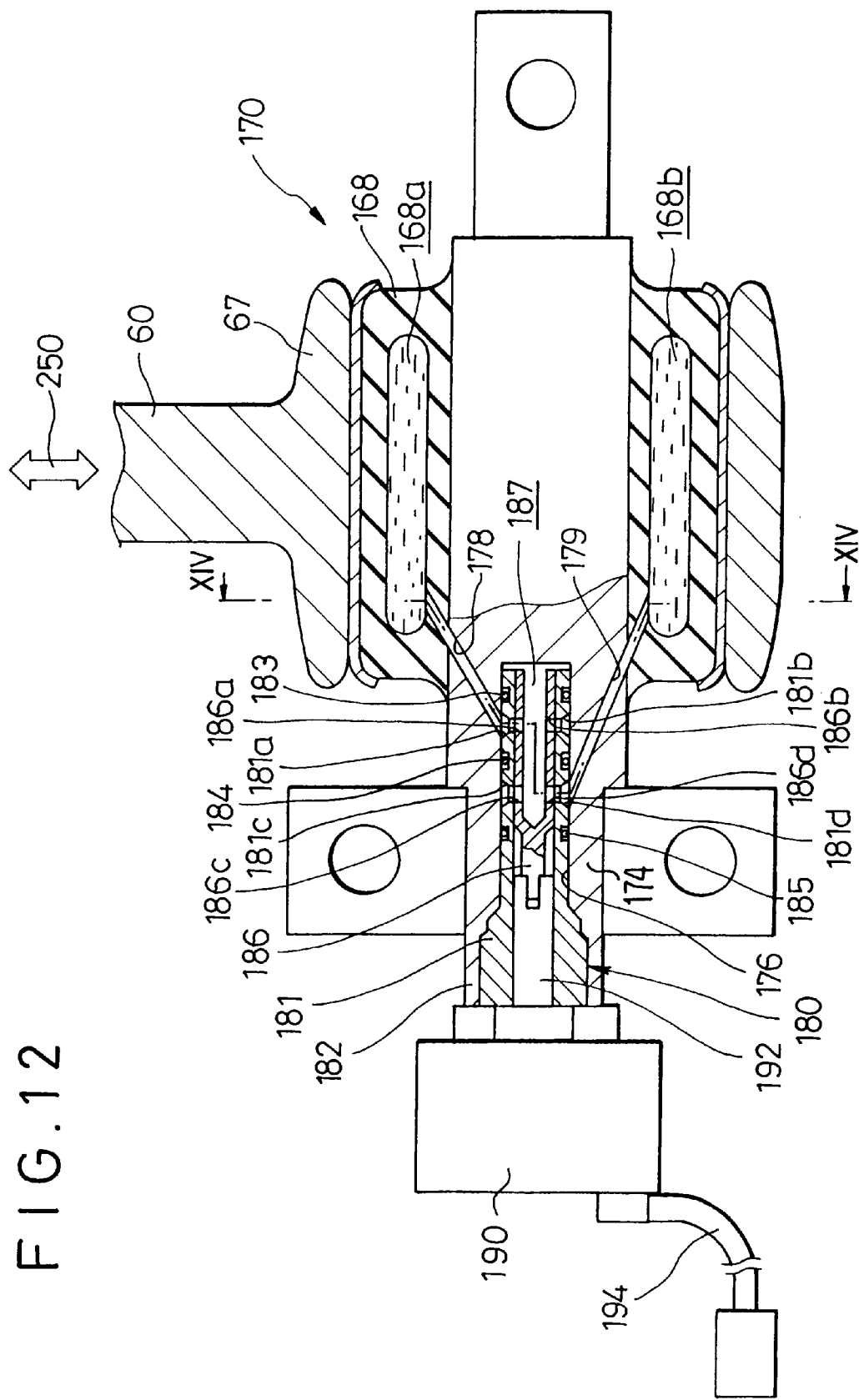
FIG. 12 is a longitudinal sectional view showing a variable-rigidity damping bush of a suspension according to a second embodiment of the present invention, having its rotor in a rotational position that allows the circulation of hydraulic oil.

Referring to FIG. 12, the variable-rigidity damping bush 170, like the case of the first embodiment, is arranged to be fitted in a ring-shaped portion 67 formed on the rear end of a compression arm 60.

A rubber bush 168, which has a liquid chamber (first fluid chamber) 168a and a liquid chamber (second fluid chamber) 168b therein, as in the case of the first embodiment, is fixed to the periphery of a body 174 of the variable-rigidity damping bush 170. The liquid chambers 68a and 68b are filled with hydraulic oil. Liquid passages (restriction passages) 178 and 179 extend from the liquid chambers 168a and 168b, respectively, into a cylinder hole 176 that is bored through the bush body 174.

A rotary spur valve (damping force regulating means) 180 is fitted in the cylinder hole 176. More specifically, a cylindrical outer tube 181 of the rotary spur valve 180 is inserted into the cylinder hole 176, with the outer peripheral surface of the outer tube disposed in contact with the inner surface of the cylinder hole 176. Also, the rotary spur valve 180 is fixed at its rear end portion 182 to the bush body 174 substantially integrally.

The outer tube 181 is bored with a pair of holes 181a and 181b, having substantially the same flow area as the liquid passage 178, in alignment with the opening of the aforesaid liquid passage 178, and is bored with a pair of holes 181c and 181d, having substantially the same flow area as the liquid passage 179, in alignment with the opening of the liquid passage 179.

Further, a cylindrical rotor 186 is fitted in the outer tube 181 in such a manner that it is in contact with the inner surface of the outer tube 181 and is rotatable around the axis thereof. The rotor 186 is bored with a pair of holes 186a and 186b and a pair of holes 186c and 186d that are positioned in the same relation as the pair of holes 181a and 181b and the pair of holes 181c and 181d mentioned before.

Figure 14:
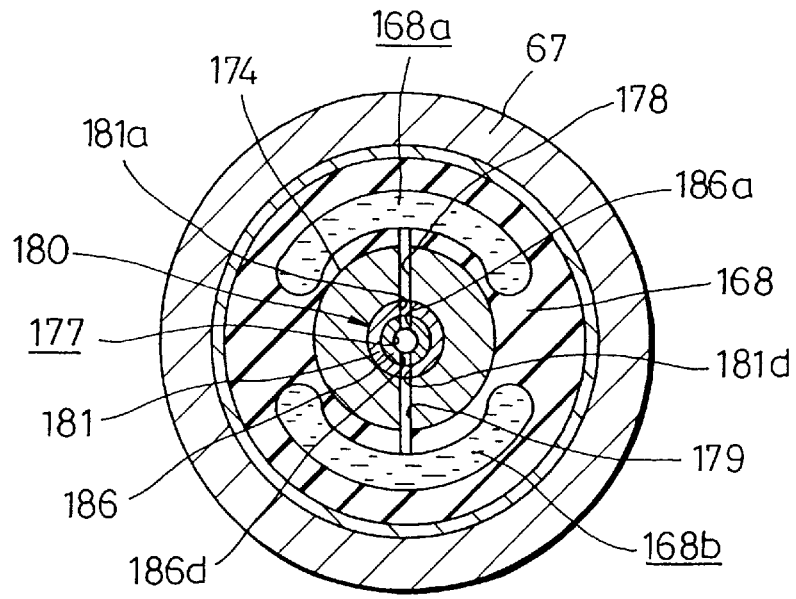
FIG. 14 is a transverse sectional view of the variable-rigidity damping bush taken along XIV—XIV of FIG. 12.

FIG. 14 shows a sectional view taken along line XIV—XIV of FIG. 12. When the rotor 186 is in the rotational position shown in FIG. 14 and the hole 186a of which is in alignment with the hole 181a of the outer tube 181, the hole 181d is also in alignment with the hole 186d. Accordingly, the hydraulic oil can reciprocate between the liquid chambers 168a and 168b through the liquid passages 178 and 179 and a chamber 187 formed in the rotor 186. In this case, the variable-rigidity damping bush 170 has a relatively small damping force.

When the rotor 186 rotates from the rotational position shown in FIG. 14 to the rotational position shown in FIG. 15, on the other hand, the respective positions of the holes 186a and 186d of the rotor 186 are deviated from the holes 181a and 181d of the outer tube 181, as will be described in detail later. In this case, the circulation of the hydraulic oil between the liquid chambers 168a and 168b is interrupted, so that the variable-rigidity damping bush 170 has a high rigidity.

As shown in FIG. 12, the rotor 186 is connected to a stepping motor 190 through a rotary shaft 192 adapted to rotate in the outer tube 181. Thus, the rotor 186 rotates in the outer tube 181 as the stepping motor 190 rotates. The stepping motor 190 is connected with a harness wire 194 through which driving signals are supplied to the stepping motor 190. The harness wire 194 is connected to an electronic control unit (ECU) 300 mentioned later.

In FIG. 12, numerals 183, 184 and 185 individually denote oil seals that are fitted on the outer tube 181 to eliminate gaps between the outer peripheral surface of the outer tube 181 and the inner surface of the cylinder hole 176.

Figure 16:
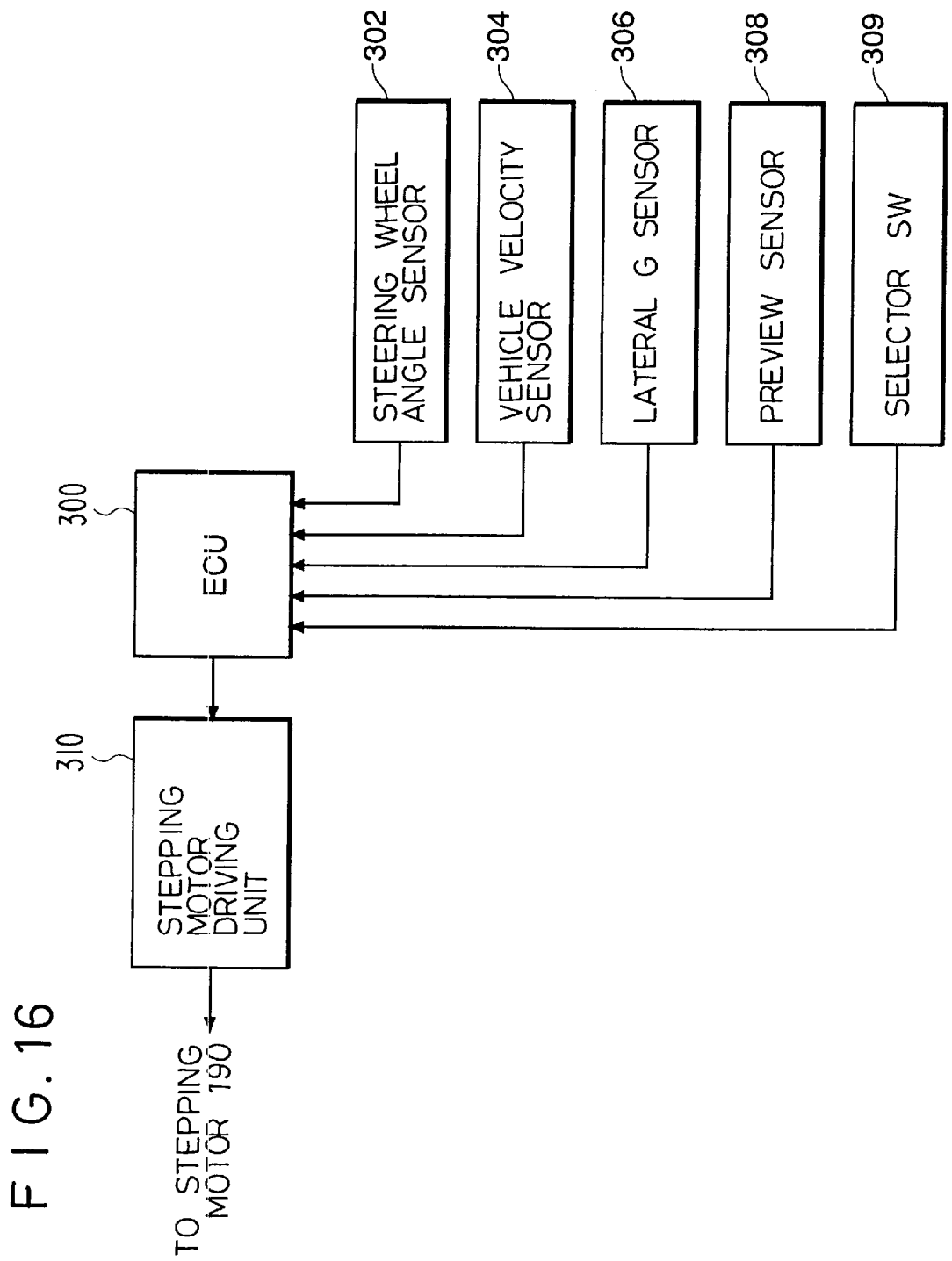
FIG. 16 is a block diagram showing the input-output connections of an electronic control unit (ECU) connected to the variable-rigidity damping bush in FIG. 12.

Referring to FIG. 16, there is shown a block diagram that illustrates the way of connection between the ECU 300, connected to the harness wire 194, and its peripheral elements.

As shown in FIG. 16, the input side of the ECU 300 is connected with a steering wheel angle sensor 302 for detecting the steering angle θ, a vehicle velocity sensor 304 for detecting a vehicle velocity V, a lateral G sensor 306 for detecting a lateral acceleration $G_Y$ of the vehicle, a preview sensor 308 attached to the front portion of the vehicle and used to detect undulations of the road surface in front of the vehicle, and a selector switch 309 for selectively switching the variable rigidity control mode of the variable-rigidity damping bush 170 to a mode HARD, SOFT, or AUTO. These sensors 302, 304, 306 and 308 and the switch 309 constitute state variable detecting means for detecting state variables of the vehicle. The output side of the ECU 300 is connected with a stepping motor driving unit 310 for controlling the drive of the stepping motor 190. The ECU 300 is adapted to deliver output signals, corresponding to input signals from the selector switch 309, steering wheel angle sensor 302, vehicle velocity sensor 304, lateral G sensor 306, and preview sensor 308, to the stepping motor driving unit 310. Thus, the stepping motor 190 rotates in response to the driving signals from the stepping motor driving unit 310, and the rotor 186 rotates in the outer tube 181.

Figure 17:
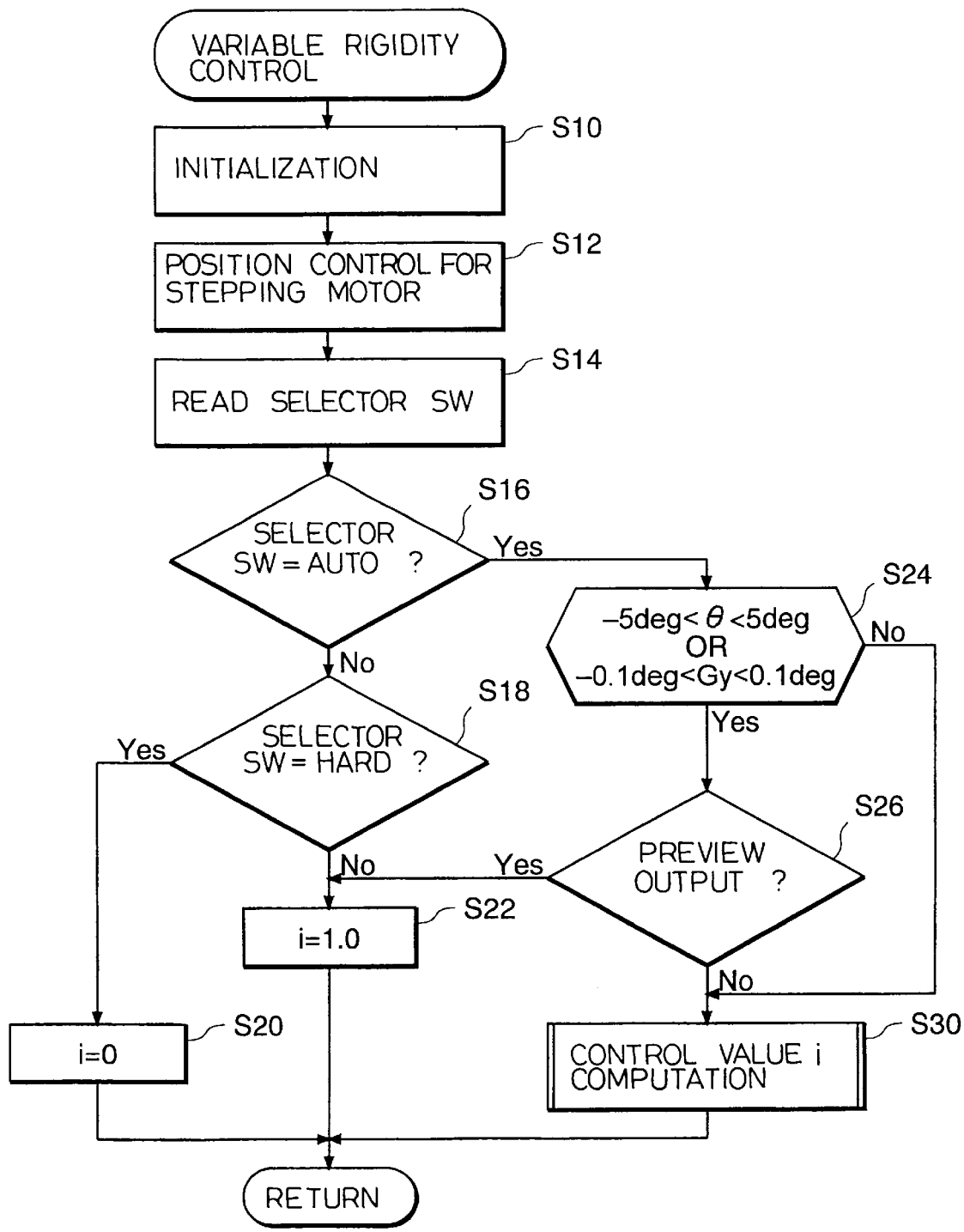
FIG. 17 is a flowchart showing a variable rigidity control routine for the variable-rigidity damping bush executed by the ECU in FIG. 16.

Referring to FIG. 17, there is shown a flowchart for that variable rigidity control routine for the variable-rigidity damping bush 170 which is executed by the ECU 300. Referring now to FIG. 17, the function of the variable-rigidity damping bush 170 constructed in the aforementioned manner will be described.

First, in Step S10, initial setting for the start of the control, that is, initialization for the control, is carried out.

In the next Step S12, stepping motor position control or feedback control for adjusting the actual amount of rotation of the stepping motor 190 to a target value is carried out. This control is an ordinary feedback control, and hence a detailed description thereof is omitted herein.

A signal indicative of the variable rigidity control mode or the shift position of the selector switch 309 is read in Step S14, and it is determined in Step S16 whether or not the selector switch 309 is shifted to an AUTO mode position so that the AUTO mode is selected by means of the selector switch 309. If the decision in Step S16 is No, the program advances to Step S18.

In Step S18, it is determined whether or not the HARD mode is selected by means of the selector switch 309, that is, whether or not the variable-rigidity damping bush 170 is in an operation state that ensures high rigidity. If the decision in this step is Yes, that is, if it is concluded that the HARD mode is selected by means of the selector switch 309, the program advances to Step S20.

In Step S20, a control value i corresponding to the value of control current delivered from the stepping motor driving unit 310 to the stepping motor 190 is set at 0 (i=0).

FIG. 19 is a graph showing the relationships between the control value i and the rigidity and damping force of the variable-rigidity damping bush 170. The rigidity is low when the control value i is small, and it gradually lowers as the control value i becomes larger, as shown in FIG. 19. As for the damping force, it does not develop due to a high rigidity when the control value i is small, and the damping force develops as the control value i increases to some extent. As the control value i increases further, the damping force gradually decreases together with the rigidity.

If the control value i is at 0, then it implies that the rigidity of the variable-rigidity damping bush 170 is enhanced by controlling the stepping motor 190 to rotate the rotor 186 so that the holes 186a and 186d of the rotor 186 are deviated entirely from the respective positions of the holes 181a and 181d of the outer tube 181.

Figure 13:
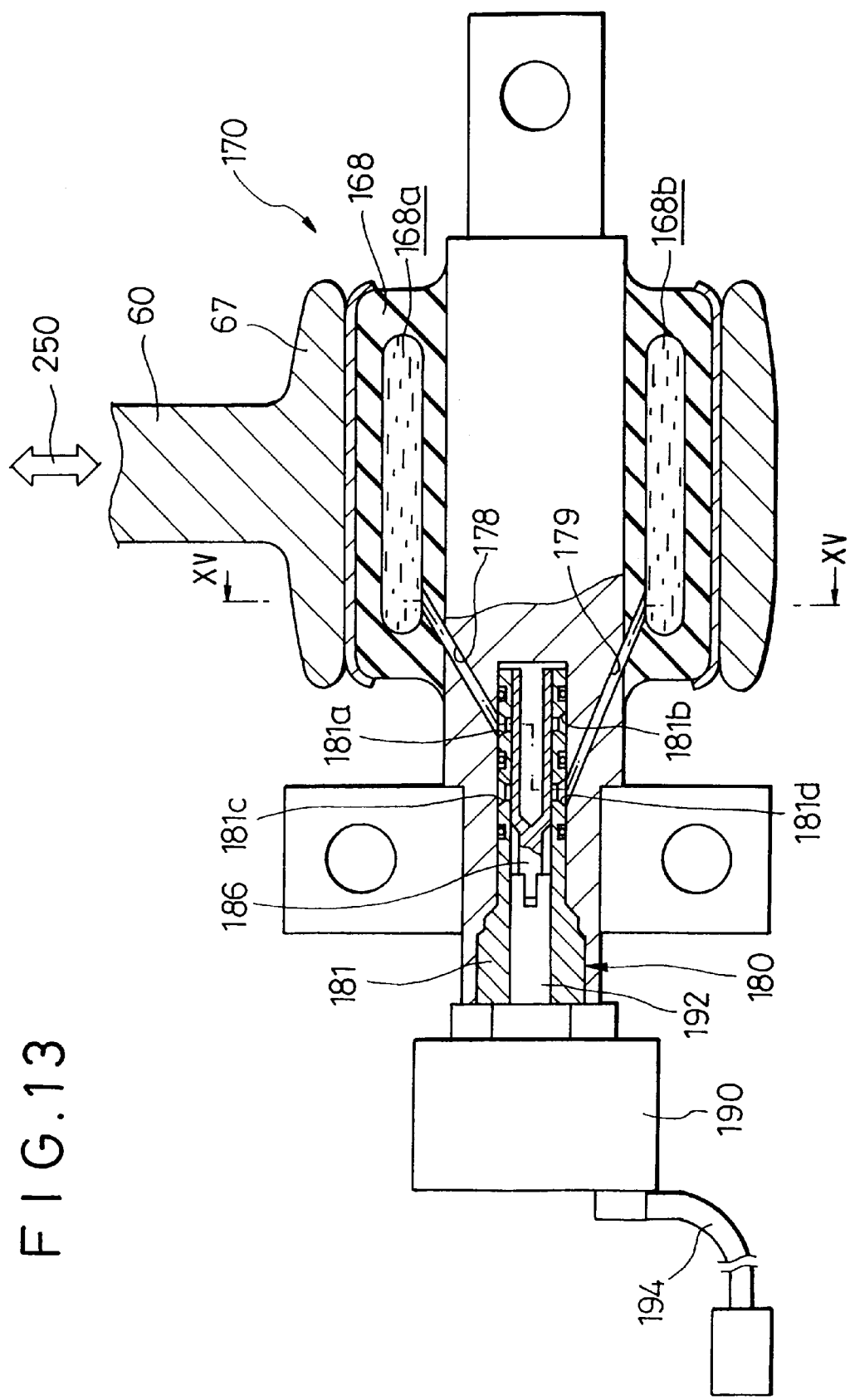
FIG. 13 is a view showing the variable-rigidity damping bush in FIG. 12 with its rotor in a rotational position that interrupts the circulation of the hydraulic oil.
Figure 15:
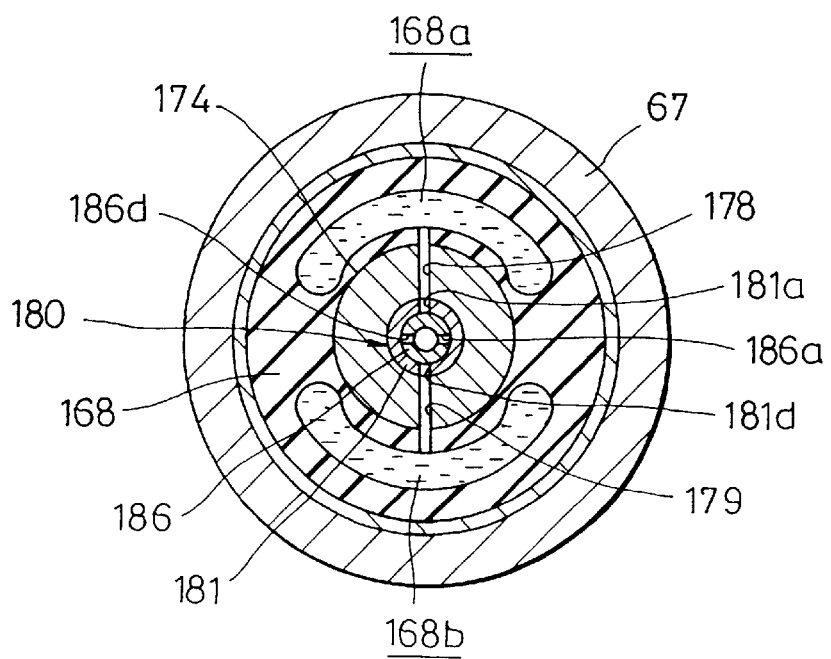
FIG. 15 is a transverse sectional view of the variable-rigidity damping bush taken along XV—XV of FIG. 13.

Referring now to FIG. 13 and FIG. 15 showing a section along line XV—XV of FIG. 13, there is shown an operation state of the variable-rigidity damping bush 170 established when the control value i is at 0. In this case, as shown in FIG. 15, the rotor 186 is rotated through about 90° from the rotational position shown in FIG. 14. The respective positions of the holes 186a and 186d are deviated entirely from the holes 181a and 181d of the outer tube 181. When the control value i is at 0, therefore, the communication between the liquid chambers 168a and 168b is interrupted completely, so that the circulation of the hydraulic oil between the two liquid chambers is prevented, and the variable-rigidity damping bush 170 has the maximum rigidity. In practice, this rotational position of the rotor 186 is a reference rotational position for the rotor 186. That is, if current supply to the stepping motor 190 is cut off, the rotor 186 takes the rotational position shown in FIG. 15.

If the decision in Step S18 is No, it can be concluded that the selector switch 309 is shifted to a SOFT mode position, not the AUTO or HARD mode position, and the program advances to Step S22. In Step S22, the control value i is set at 1.0 (i=1.0). If the control value i is at 1.0, then it implies that the rigidity of the variable-rigidity damping bush 170 is lowered to its minimum value by controlling the stepping motor 190 to rotate the rotor 186 to the rotational position shown in FIGS. 12 and 14 so that the respective positions of the holes 181a and 181d of the outer tube 181 are completely in line with the holes 186a and 186d of the rotor 186 (see FIG. 19).

If the decision in Step S16 mentioned before is Yes, that is, if it is concluded that the AUTO mode is selected by means of the selector switch 309, the program advances to Step S24. In Step S24, it is determined whether or not the steering angle θ or the lateral acceleration $G_Y$ is within a predetermined range. Specifically, it is determined whether or not the steering angle θ is greater than –5 degrees and smaller than 5 degrees, for example. Alternatively, it is determined whether or not the lateral acceleration $G_Y$ is higher than –0.1 g and lower than 0.1 g, for example. If the steering angle θ or the lateral acceleration $G_Y$ falls within the predetermined range, then it implies that the vehicle is traveling straight without turning.

If the decision in Step S24 is No, that is, if it is concluded that the steering angle θ or the lateral acceleration $G_Y$ falls outside the predetermined range and that the vehicle is turning, the program advances to Step S30.

In Step S30, the control value i is computed in order to set a suitable control value i. That is, in Step S30, the optimum control value i is obtained depending on the vehicle driving conditions, whereby the optimum rigidity and damping force are obtained (see FIG. 19). In computing the control value i, a control value i computation routine shown in FIG. 18 is executed. Referring now to FIG. 18, a computation procedure for the control value i will be described.

In Step S32, a control value iv corresponding to the vehicle velocity V is obtained from a map shown in FIG. 20 in which the relationship between the vehicle velocity V and the control value iv is preset. In this map, the control value iv is set in such a manner that it becomes smaller, that is, the rigidity is enhanced, as the vehicle velocity V increases.

Figure 21:
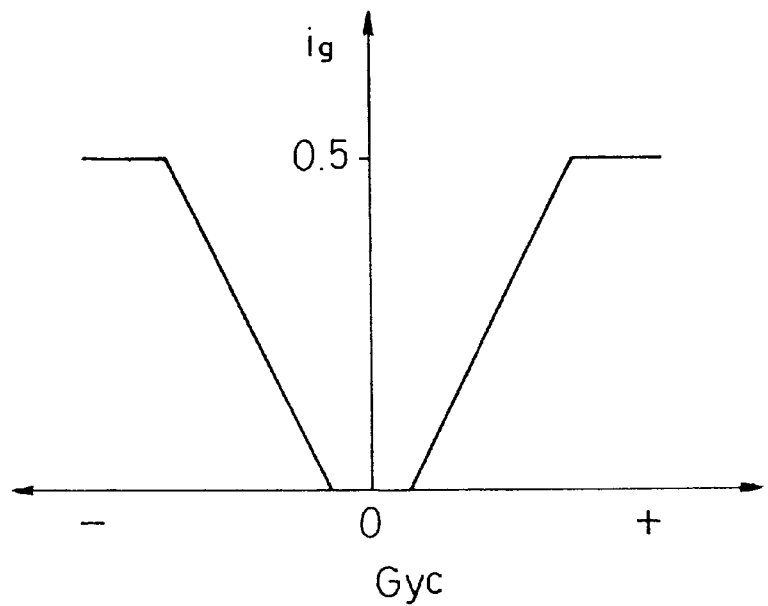
FIG. 21 is a graph showing the relationship between a calculated lateral acceleration $G_{Y_c}$ and a control value ig.

In the next Step S34, a control value ig, corresponding to a calculated lateral acceleration $G_{Yc}$ computed in accordance with the steering angle θ detected by means of the steering wheel angle sensor 302, is obtained from a map shown in FIG. 21. The relationship between the calculated lateral acceleration $G_{Yc}$ and the control value ig is preset in this map. This control value ig is a correction value for the control value iv, and its maximum value is set at 0.5, for example.

In Step S36, a control value ic is determined by subtracting the control value ig from the control value iv obtained in the aforesaid manner (ic=iv–ig). The greater the control value ig, that is, the higher the calculated lateral acceleration $G_{Yc}$, the smaller the control value ic will be. Thus, in the turning mode, the control value ic is made smaller to enhance the rigidity despite the fixed vehicle velocity V.

In Step S38, it is determined whether or not the lateral acceleration $G_Y$ detected by the lateral G sensor 306 changes at or above a predetermined frequency, e.g., 2.5 Hz or more. In other words, it is determined whether or not the vehicle is traveling on such a bad road in which zigzag drive or the like is required. If the decision in Step S38 is Yes, a bad-road flag $F_R$ is set at a value of 1 in Step S40. If the decision in this step is No, on the other hand, the bad-road flag $F_R$ is set at a value of 0 in Step S42.

In Step S50, it is determined whether or not the bad-road flag $F_R$ is at 1. If the decision in this step is Yes, that is, if it is concluded that the vehicle is traveling on a bad road, the program advances to Step S52. In Step S52, the control value ic is multiplied by a bad-road correction factor $K_R$ ($0 \leq K_R < 1$), and correction is made such that the control value ic is made smaller to enhance the rigidity.

Then, the program advances to Step S54 in which the control value i is set at the control value ic. If the decision in Step S50 is No, the program advances from Step S50 to Step S54, whereupon the control value ic not having undergone bad-road correction is set as the control value i.

When the control value i is calculated in this manner, the stepping motor 190 rotates the rotor 186 by an amount corresponding to the control value i. In this case, the rotational position of the rotor 186 is an intermediate position between the position shown in FIG. 14 and the position shown in FIG. 15. As a result, margins for lapping between the holes 181a and 181d of the outer tube 181 and the holes 186a and 186d of the rotor 186 change so that the flow area is regulated, whereby the rigidity of the variable-rigidity damping bush 170 can be adjusted suitably (see FIG. 19).

Referring again to FIG. 17, if the decision in Step S24 of the variable rigidity control routine is Yes, that is, if it is concluded that the vehicle is traveling straight, the program advances to Step S26. In this step, it is determined whether or not a signal is delivered from the preview sensor 308. If the decision in Step S26 is Yes, that is, if it is concluded that the road in front of the vehicle is subject to undulations, the program advances to Step S22, mentioned before, in which the control value i is set at a value of 1.0, to decrease the rigidity of the variable-rigidity damping bush 170, thereby preventing a shock which would be otherwise caused when the vehicle gets over an undulation.

If the decision in Step S26 is No, that is, if it is concluded that no signal is delivered from the preview sensor 308, on the other hand, the program advances to Step S30 mentioned before, to carry out the computation of the control value i with reference to the flowchart of FIG. 18. Thus, if the decision in Step S16 is Yes, that is, if it is concluded that the AUTO mode is selected by means of the selector switch 309, the optimum control value i is always computed in Step S30 except when an output signal from the preview sensor 308 is detected, whereby the suitable rigidity of the variable-rigidity damping bush 170 can be obtained.

According to the suspension apparatus of the second embodiment, as described above, the control value i is set in response to the mode change by means of the selector switch 309, and the control value 1 is set at the optimum value in accordance with the vehicle velocity V, lateral acceleration $G_Y$, steering angle θ, etc. Thus, in the case where the vehicle velocity V, lateral acceleration $G_Y$, and steering angle θ are low or small, the rigidity of the variable-rigidity damping bush 170 can be suitably lowered to give priority to comfortableness to ride in. In the case where the vehicle velocity V, lateral acceleration $G_Y$, and steering angle θ are high or great, on the other hand, the rigidity of the variable-rigidity damping bush 170 can be fully enhanced to reduce the displacement of the compression arm 60 or the wheel 1. By doing this, shimmy or the like can be eliminated to improve the traveling stability of the vehicle at the time of a high-speed straight traveling. At the time of turning, the cornering force can be securely caused to act on the vehicle body, thereby improving the turning performance.

In the suspension apparatus of the present invention, as described in detail herein in connection with the first and second embodiments, the lower arm is divided into the lateral arm 31 and the compression arm 60, whereby the force acting on the vehicle body through the lower arm can be lessened to protect the lower arm against unreasonable load, so that the durability of the lower arm unit 30 can be improved. In this case, there is no such joint as is used in the prior art on the line W between the pivot O and the kingpin axis X. Further, the lateral arm 31 is formed of a single rigid body. Accordingly, no alignment change occurs even in the case where a force exerting in the transverse direction of the vehicle acts directly on the wheel 1.

Further, the small-sized variable-rigidity damping bush 70 or 170 is provided between the compression arm 60 and the vehicle body, and its rigidity and damping performance are adjusted depending on the traveling state of the vehicle. At the time of straight traveling, therefore, satisfactory riding comfortableness and traveling stability can be secured in accordance with the vehicle velocity V and the like. At the time of turning, a satisfactory turning performance conforming to the steering wheel operation can be ensured.

Furthermore, the rigidity $Ka_Y$ of the rubber bush 34 of the lateral arm 31 in the transverse direction of the vehicle is set at a proper rigidity value such that the transverse displacement (Δy) and steering angle change (Δθs) of the wheel 1 can be minimized in a well-balanced manner. Even in the case where the force $F_W$ acts on the wheel 1 to swing the lateral arm 31 in the longitudinal direction of the vehicle around the pivot O, thereby causing the tie rod 28 to swing around the pivot T, while the vehicle is traveling, therefore, the transverse position and toe angle of the wheel 1, which is supported by the knuckle 22 connected to the respective distal ends of the lateral arm 31 and the tie rod 28, can be maintained very suitably without any change. Thus, the traveling stability of the vehicle, especially the traveling stability at the time of braking or accelerating operation during the straight traveling, can be maintained satisfactorily.

Also, the variable-rigidity damping bush 70 or the variable-rigidity damping bush 170 can be easily applied without changing the conventional construction of the junctions between the vehicle body and the lateral and compression arms 31 and 60. Accordingly, the conventional vehicle body construction can be diverted for use with the suspension apparatus of the present invention, so that the production cost can be reduced.

When the wheel 1 is displaced in the vertical direction of the vehicle, the lateral arm 31 swings around the bolt 35 extending through the mounting brackets 3, 3, and the compression arm 60 swings around the variable-rigidity damping bush 70 or 170 in the direction different from the swinging direction of the lateral arm. As a result, the junction (pivot Q) between the lateral arm 31 and the compression arm 60 is twisted. According to the foregoing embodiments, however, the rubber bush 64 is used at this junction, so that the rubber bush 64 absorbs the twist satisfactorily, thereby allowing the vertical displacement of the wheel 1. Thus, the suspension function of the strut-type suspension 10 cannot be ruined.

Although the rubber bush 64 is used, in the foregoing embodiments, at the junction (pivot Q) between the lateral arm 31 and the compression arm 60 to permit the swinging motion, a ball joint may be used in place of the rubber bush 64 with the same effect.

According to the foregoing embodiments, the variable rigidity control with quite the same contents is carried out for both front-right and front-left wheels. Alternatively, the front-right-wheel side and the front-left-wheel side may be controlled independently of each other.

The following is a description of a suspension apparatus according to a third embodiment of the present invention.

Also in this third embodiment, only the variable-rigidity damping bush 70 for the front-right wheel and the variable-rigidity damping bush for the front-left wheel, of the strut-type suspension 10 described in connection with the first embodiment, are replaced with actuators 470, 470. A description of component parts common to this embodiment and the first embodiment is omitted herein, and the construction and operation of the actuator 470 applied to the right wheel will be described in the main with reference to FIGS. 23 to 25.

Figure 23:
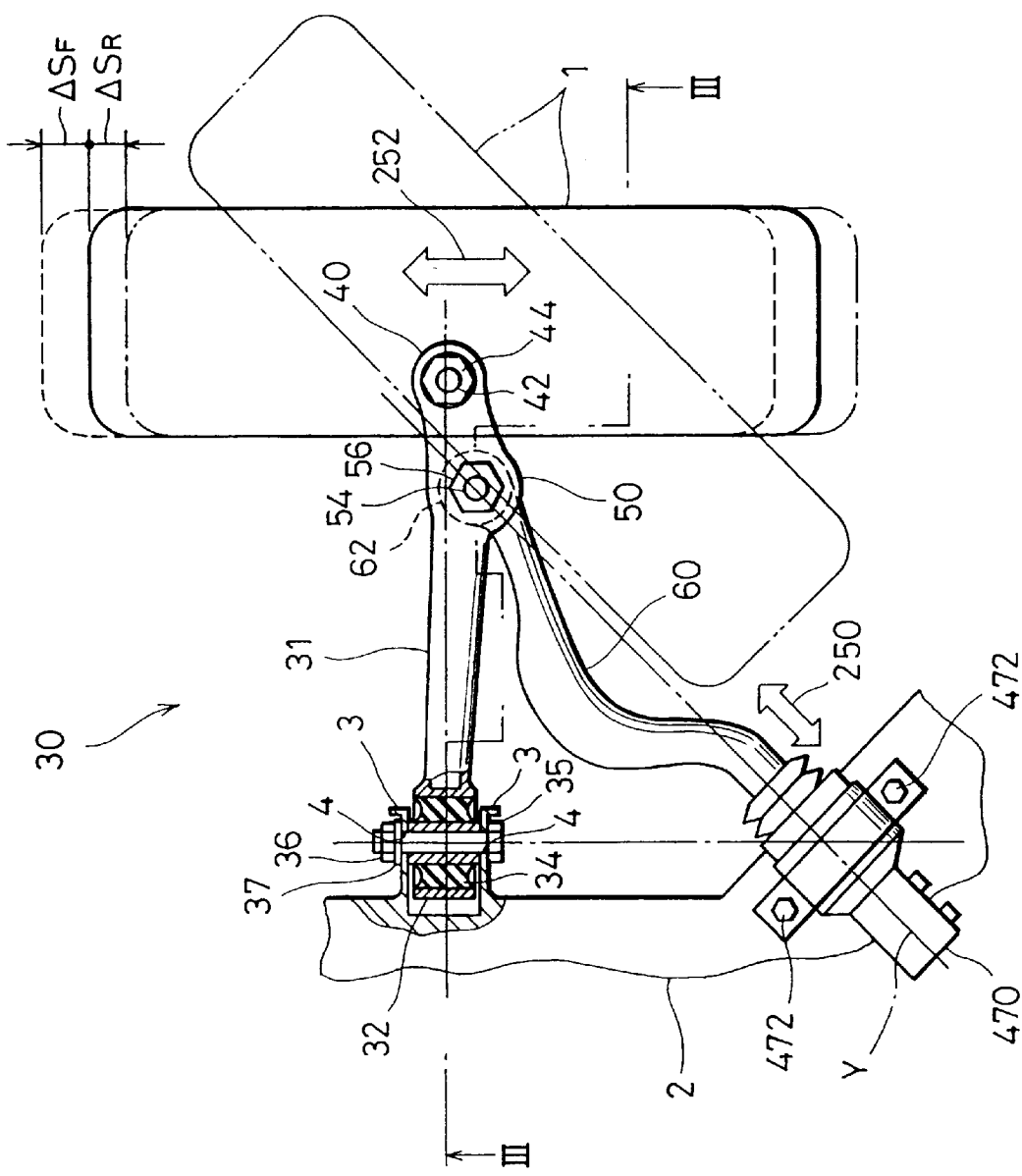
FIG. 23 is a plan view, partially in section, showing a lower arm unit of a strut-type suspension according to a third embodiment of the present invention.

As shown in FIG. 23, the actuator (regulating means) 470 is connected to the rear end of the compression arm 60, and is fixed to the member 2 by means of a pair of bolts 472, 472.

Figure 24:
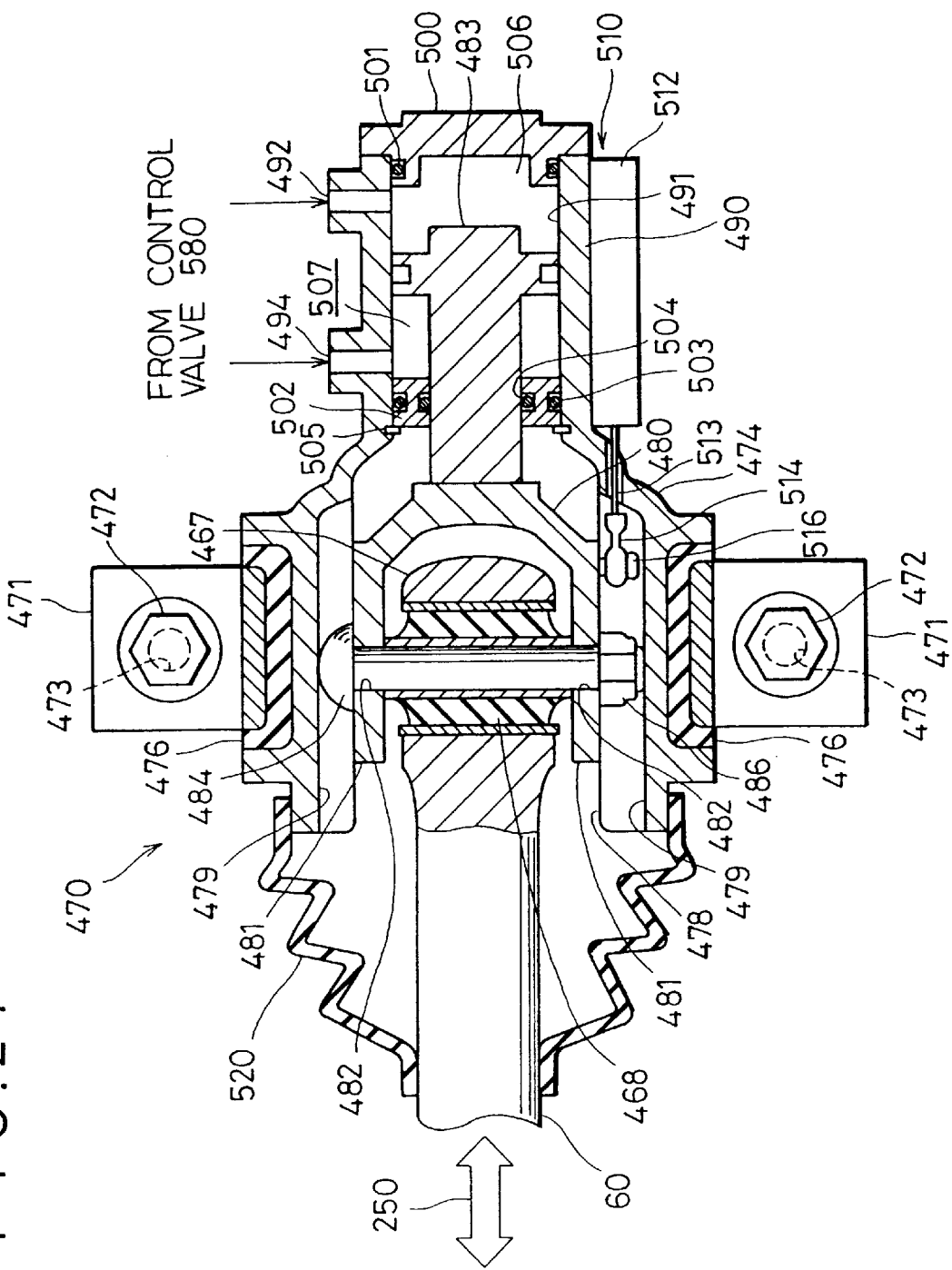
FIG. 24 is a longitudinal sectional view showing an actuator in FIG. 23.

A conventional structure, such as the one shown in FIG. 24, is used as the actuator 470. The following is a description of the construction of the actuator 470 and the way of connection between the rear end of the compression arm 60 and the actuator 470.

As shown in FIG. 24, a ring-shaped portion 467 is formed on the rear end of the compression arm 60. A rubber bush 468 is fixed in the ring-shaped portion 467 coaxially with the ring-shaped portion 467.

A U-shaped connecting bracket 480 is provided in a body 474 of the actuator 470 so as to be slidable along an inner surface 478 of the actuator body 474 in the horizontal direction as viewed on the sheet of drawing paper. Through holes 482, 482 are bored individually through a pair of parallel portions 481, 481 of the connecting bracket 480. A bolt 484 penetrates these through holes 482, 482 and the rubber bush 468. In this manner, the rear end of the compression arm 60 is connected to the connecting bracket 480 (second junction).

A lock nut 486 is screwed on the distal end portion of the bolt 484, whereby the bolt 484 is fixed to the connecting bracket 480 so as not to slip off, and the compression arm 60 is stably supported on the actuator 470.

Since there are no gaps between the opposite ends of the rubber bush 468 and the parallel portions 481, 481 of the connecting bracket 480, the rubber bush 468 is held without play between the parallel portions 481, 481. Although fastened to each other, the rubber bush 468 and the bolt 484, like the rubber bush 64 and the bolt 54 mentioned before, can satisfactorily swing around the bolt 484 as the rubber bush 468 bends.

A pair of grooves 479, 479 are formed on the inner surface 478 of the actuator body 474. A hemispherical head of the bolt 484 is situated in one of the grooves 479, 479, and the lock nut 486 in the other groove 479, whereby the bolt 484 can move satisfactorily in the horizontal direction as viewed on the sheet of drawing paper.

Further, a piston 483 is combined integrally to the connecting bracket 480. This piston 483 is slidable along an inner surface 491 of a cylinder portion 490 of the actuator body 474 in the horizontal direction as viewed on the sheet of drawing paper. When the piston 483 slides in the cylinder portion 490, the connecting bracket 480 also slides along the inner surface 478 of the actuator body, whereby the compression arm 60 can be displaced in the horizontal direction as viewed on the sheet of drawing paper, as indicated by a blank arrow 250 in FIG. 24.

A cap 500 having an oil seal 501 thereon is fitted on the extreme end portion of the cylinder portion 490. This cap is, e.g., threadedly engaged with the cylinder portion 490 and is combined therewith. A chamber 506 is defined between the piston 483 and the cap 500.

At that termination end of the cylinder portion 490 which is situated near the central portion of the actuator body 474, a ring-shaped partition wall 502 is fitted on the piston 483 and is positioned by means of a stopper 505. A chamber 507 is defined between the piston 483 and the partition wall 502.

The cylinder portion 490 is provided with a port 492 on the side of the chamber 506 and a port 494 on the side of the chamber 507. These ports 492 and 494 are connected to control valves 580 and 581, respectively (see FIG. 25), which will be mentioned later, so that hydraulic oil is supplied to one of the chambers 506 and 507 and discharged from the other through the ports 492 and 494. When the hydraulic oil is fed into the chamber 506 or 507, a pressure difference is caused between the chambers 506 and 507, and the piston 483 slides to the left or right along the drawing plane, depending on the pressure difference.

When the piston 483 slides in this manner, the compression arm 60 is displaced through the connecting bracket 480, as indicated by the blank arrow 250. Thereupon, the compression arm 60 causes the compression arm junctions 50, 50 to be displaced, via the rubber bush 64 and the bolt 54 shown in FIG. 3, thereby swinging the lateral arm 31 around the rubber bush 34. When the lateral arm 31 swings in this manner, the knuckle junction 40 is displaced, as indicated by a blank arrow 252 in FIG. 23, and the position of the wheel 1 also changes correspondingly in the longitudinal direction of the vehicle. In other words, the wheel base between front and rear wheels increases or decreases.

As this is done, the knuckle junction 40 swings around a rubber damper, as a fulcrum, in the strut mount 12, like a swinging pendulum. The resulting change of the position of the wheel 1 indicates a change of a caster trail Sc. Thus, the inclination of the kingpin axis X, that is, caster angle, increases or decreases as the piston 483 slides.

The chamber 506 is sealed by means of the aforementioned oil seal 501, and the chamber 507 is sealed by means of a seal 503 fitted on the partition wall 502 and an oil seal 504 fitted in the inner periphery of the partition wall 502. Thus, the hydraulic oil in the chambers 506 and 507 never leaks out.

A bracket 471 is used to attach the actuator 470 to the member 2. Through holes 473, 473 are bored through the bracket 471. By fastening the bolts 472, 472, inserted through these through holes, to the member 2, the bracket 471 is fixed thereto so that the actuator 470 is fixed to the member 2. Numeral 476 denotes a rubber mount interposed between the actuator 470 and the bracket 471.

A stroke sensor (actual displacement detecting means) 510 is mounted on the outer surface of the cylinder portion 490 of the actuator 470. A rod 513 extends from a body 512 of the stroke sensor 510, and a distal end portion 514 of this rod 513 penetrates the actuator body 474 and is connected to a pin 516 that protrudes from the connecting bracket 480. When the connecting bracket 480 moves, the rod 513 of the stroke sensor 510 moves correspondingly. Based on this movement, a stroke amount D of the connecting bracket 480 is detected. Then, a stroke signal is outputted.

In FIG. 24, numeral 520 denotes a flexible rubber boot, one end of which is fitted on the compression arm 60 and the other end of which is fitted on the body 474 of the actuator 470. The boot 520 serves to prevent foreign matter from getting into the actuator 470, that is, the sliding portion of the connecting bracket 480.

Figure 25:
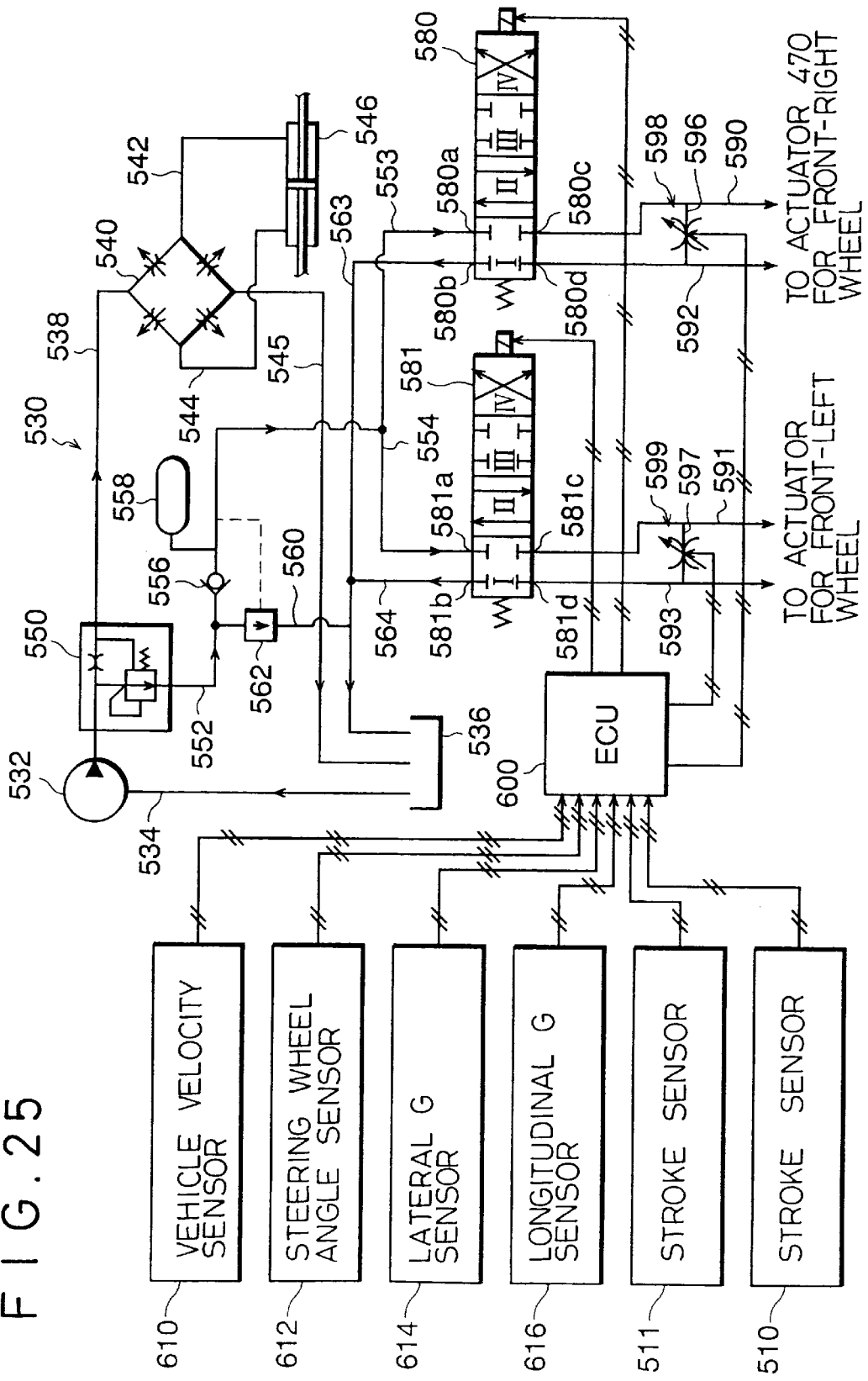
FIG. 25 is a schematic view showing a hydraulic control unit for actuating the actuator in FIG. 23.
Figure 26:
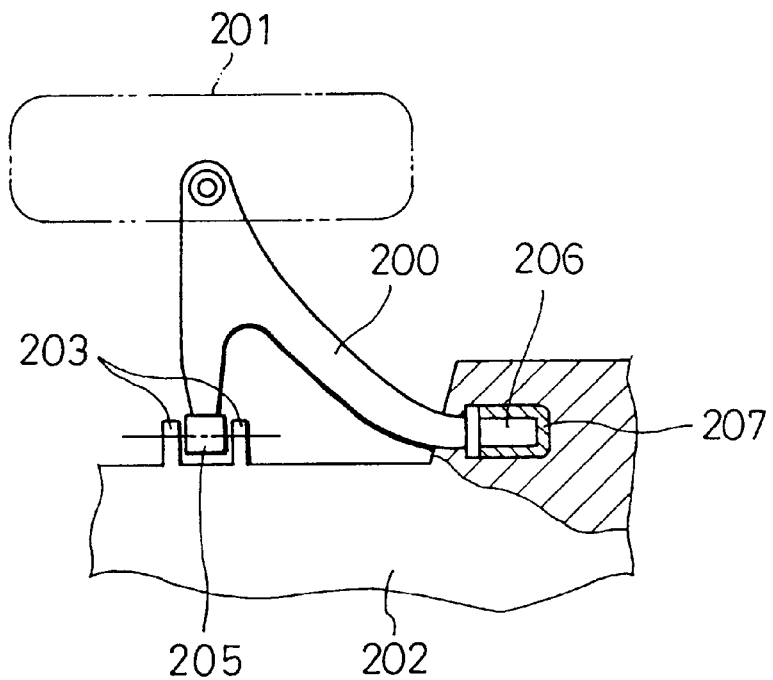
FIG. 26 is a view showing a conventional integral-type A-shaped lower arm.
Figure 27:
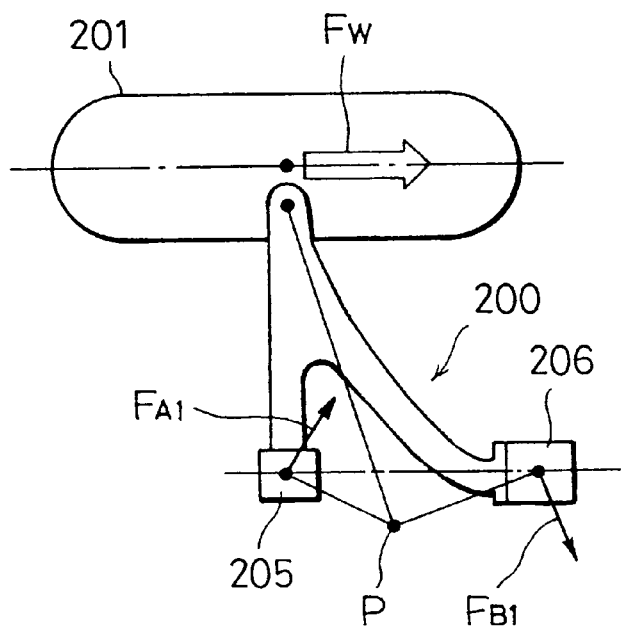
FIG. 27 is a view showing those component forces $F_{A1}$ and $F_{B1}$ for individual arms of the conventional integral-type A-shaped lower arm which act on the vehicle body as the input force $F_W$ is applied to the wheel.
Figure 28:
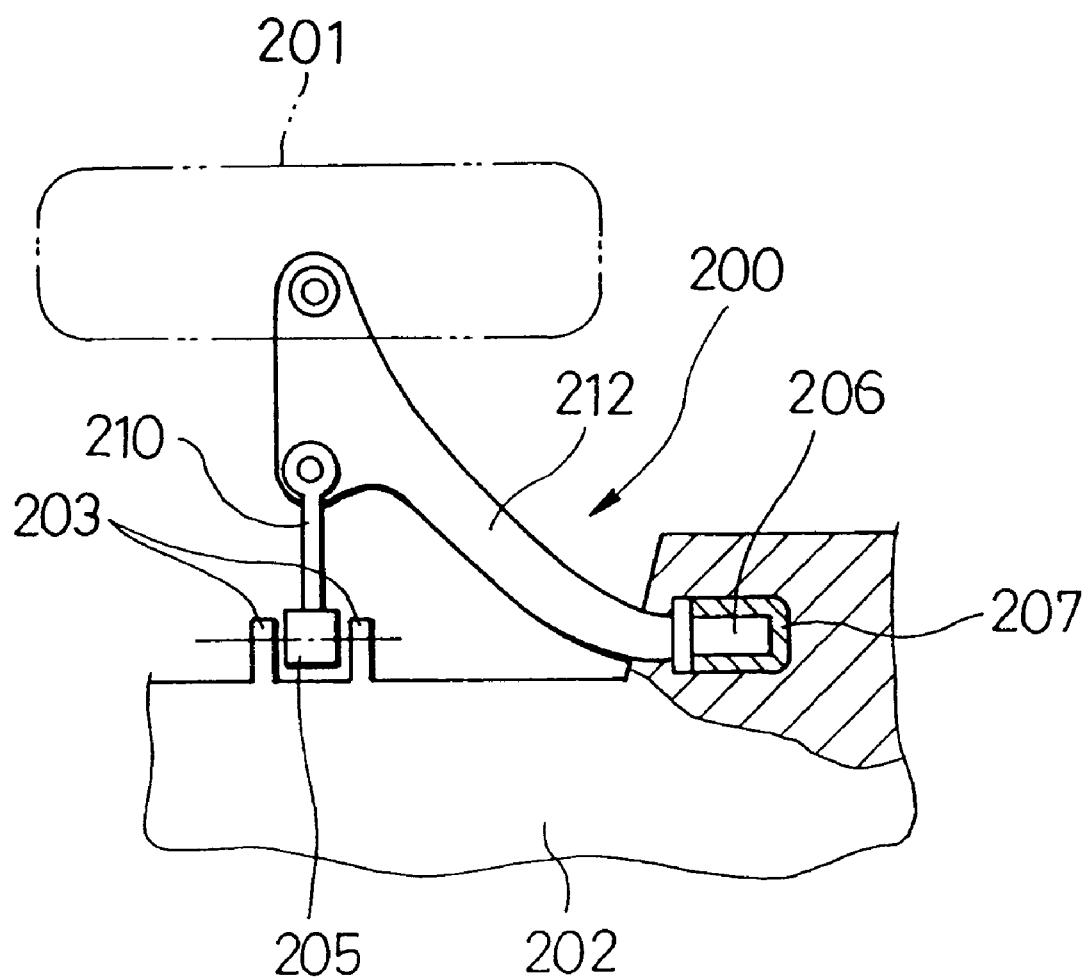
FIG. 28 is a view showing a conventional split-type lower arm.

FIG. 25 shows a hydraulic control unit (liquid pressure supply means) 530 for actuating the actuator 470. The following is a description of the construction of the hydraulic control unit 530. This hydraulic control unit 530 also functions as a hydraulic circuit for a power steering, and the construction of the power steering will be described at the same time.

As shown in FIG. 25, the hydraulic control unit 530 is provided with a pump 532 for producing oil pressure. This pump 532 is driven by means of an engine (not shown), and is always actuated when the engine is operating.

A line 534 is connected to the suction port of the pump 532. The line 534 extends to a drain tank 536 in which the hydraulic oil is stored. A line 538 is connected to the discharge port of the pump 532. A power steering valve 540 is connected to the line 538. Lines 542 and 544 and a line 545 are connected to the power steering valve 540. The lines 542 and 544 are connected to a power cylinder 546, and the line 545 extends to the drain tank 536. The power steering valve 540 and the power cylinder 546 are conventionally known, and a detailed description of them is omitted herein.

A priority valve 550 is inserted in the line 538. In the priority valve 550, a line 552 is branched from the line 538. The priority valve 550 is so constructed that it normally allows the hydraulic oil to circulate in the line 538 on priority basis, and that the hydraulic oil flows into the line 552 when the engine rotation is enhanced so that the discharge of the pump 532 is increased.

The line 552 branched from the line 538 is further branched into lines 553 and 554. The line 553 is connected to a feed port 580a of the control valve 580 for the front-right wheel, while the line 554 is connected to a feed port 581a of the control valve 581 for the front-left wheel.

Both the control valves 580 and 581 are normally-closed four-position solenoid valves, which can shift to positions designated by symbols I, II, III and IV in response to signal supply to the solenoid portions of the control valves, as shown in FIG. 25, thereby switching the circulation of the hydraulic oil. There is no signal supply to the solenoid portions when the engine is stopped or when the key is in an off position. In this case, the position is kept at a normally-closed position, i.e., a position which is designated by symbol I (FIG. 25). At the time of stroke-hold after the start of engine operation (with the key in an on position each control valve is kept in the position designated by symbol III.

Inserted in the line 552 is a check valve 556, which allows the hydraulic oil to flow from the priority valve 550 toward the ports 580a and 581a and which prevents a reverse flow from the ports 580a and 581a toward the priority valve 550.

Between the check valve 556 and the ports 580a and 581a, moreover, an accumulator 558 is connected to the line 552. This accumulator 558 stores the hydraulic oil discharged from the pump 532 and discharges the stored hydraulic oil under a predetermined pressure, whereby the hydraulic oil is steadily supplied to the ports 580a and 581a under the predetermined pressure.

Between the priority valve 550 and the check valve 556, a line 560 is branched from the line 552 and extends to the drain tank 536. An accumulator control valve 562 is inserted in the line 560. The accumulator control valve 562 responds to the oil pressure (pilot pressure) on the downstream side of the check valve 556, and is opened when the oil pressure reaches or exceeds the aforesaid predetermined pressure. Thus, the accumulator control valve 562 serves to let the hydraulic oil, discharged from the pump 532 and introduced into the line 552, to return to the drain tank 536 when the storage in the accumulator 558 increases to its limit.

Lines 563 and 564 extend from exhaust ports 580b and 581b of the control valves 580 and 581, respectively. These lines 563 and 564 join together and reach the drain tank 536 via the line 560.

Lines 590 and 591 are connected to ports 580c and 581c of the control valves 580 and 581, respectively. The line 590 is connected to the aforesaid port 492 of the actuator 470 for the front-right wheel, while the line 591 is connected to an actuator (not shown) for the front-left wheel in like manner.

Lines 592 and 593 are connected to ports 580d and 581d of the control valves 580 and 581, respectively. The line 592 is connected to the port 494 of the actuator 470 for the front-right wheel, while the line 593 is connected to the actuator (not shown) for the front-left wheel in like manner.

Further, the lines 590 and 592 extending from the control valve 580 for the front-right wheel are connected to each other via a line 596, while the lines 591 and 593 extending from the control valve 581 for the front-left wheel are connected to each other via a line 597. Communication valves 598 and 599, comprised of on-off solenoid valves are inserted in these lines 596 and 597, respectively.

The hydraulic control unit 530 is provided with an electronic control unit (ECU) 600 as control means. The ECU 600 is connected at its input side with state variable detecting means, including a vehicle velocity sensor 610 for detecting the vehicle velocity V, a steering wheel angle sensor 612 for detecting the steering wheel angle θ, a lateral G sensor 614 for detecting the lateral acceleration $G_Y$ acting on the vehicle, a longitudinal G sensor 616 for detecting the longitudinal acceleration $G_X$ acting on the vehicle, the aforesaid stroke sensor 510 for the front-right wheel, and a stroke sensor 511 attached to the actuator for the front-left wheel, so that the ECU is supplied with various input signals.

On the other hand, the output side of the ECU 600 is connected with the respective solenoid portions of the aforesaid control valves 580 and 581 and the communication valves 598 and 599. These individual output-side valves are supplied with output signals responsive to the input signals.

More specifically, in connection with the control valves 580 and 581, the required stroke amount for the piston 483 of the actuator 470 is previously set at three values, a maximum required stroke amount D1, standard required stroke amount D2, and minimum required stroke amount D3 (D1>D2>D3). The ECU 600 selects the required piston stroke amount D1, D2 or D3 for each of the control valves 580 and 581 in accordance with the vehicle velocity V, steering wheel angle θ, lateral acceleration $G_Y$, and longitudinal acceleration $G_X$. Then, the ECU 600 calculates a difference $\Delta_D$ between the selected required stroke amount D1, D2 or D3 and an actual stroke amount D detected by a corresponding one of the stroke sensors 510 and 511 (D1−D, D2−D, D3−D). If this difference AD is positive ($\Delta_D$>0), the control valve 580 or 581 concerned is supplied with a driving signal S1 for shifting the valve position from the position designated by symbol III to the position designated by symbol II in FIG. 25. If the stroke deviation $\Delta_D$ is negative ($\Delta_D$<0), on the other hand, a driving signal S2 for shifting the position of the control valve to the position designated by symbol IV is supplied. Thus, the quantity of hydraulic oil supply to the corresponding one of the chambers 506 and 507 of the actuator 470 is suitably adjusted so that the actual piston stroke amount D can always conform satisfactorily with the required stroke amount D1, D2 or D3. Thereupon, the displacement of the compression arm 60 is controlled.

When the actual stroke amount D becomes equal to the required stroke amount D1, D2 or D3, the supply of the driving signal S1 or S2 is stopped, and the position of each of the control valves 580 and 581 is restored to the position designated by symbol III. Thereupon, the circulation of the hydraulic oil is interrupted, and the oil pressure in the chambers 506 and 507 of the actuator 470 is held, so that the actual stroke amount D is kept at the required stroke amount D1, D2 or D3.

As for the communication valves 598 and 599, they are supplied with a valve-opening signal in the case where none of the values of the vehicle velocity V, steering wheel angle θ, lateral acceleration $G_Y$, and longitudinal acceleration $G_X$ are greater than their respective preset values. If any of the values of the vehicle velocity V, steering wheel angle θ, lateral acceleration $G_Y$, and longitudinal acceleration $G_X$ is greater than its predetermined value, on the other hand, the communication valves 598 and 599 are supplied with a valve-closing signal.

Referring now to FIGS. 23, 24 and 25, the operation of the suspension apparatus constructed in the above manner will be described for respective traveling states of the vehicle. Although the description will be made mainly in connection with front-right-wheel side, the same operation is performed on the front-left-wheel side.

At the Time of Medium-Speed Traveling (Normal Traveling):

If it is concluded, in accordance with a signal from the vehicle velocity sensor 610, that the vehicle velocity V is intermediate between predetermined values V1 and V2

(V1<V<V2) and hence the vehicle is traveling at medium speed, the ECU 600 in FIG. 25 supplies the driving signal S1 or S2 to the control valves 580 and 581, depending on the difference ($\Delta_D$=D2−D) between the standard required stroke amount D2 and the actual stroke amount D.

In the case where the piston stroke deviation ΔD is positive ($\Delta_D$>0) and hence the driving signal S1 is supplied to the control valves 580 and 581, the position of each control valve is shifted to the position designated by symbol II. In the position II, the ports 580a and 580c communicate with each other, and the ports 581a and 581c communicate with each other. In connection with the front-right wheel, the hydraulic oil in the accumulator 558 is fed into the chamber 506 of the actuator 470, and the piston 483 is pushed to the left as viewed on the sheet of paper of FIG. 24 under a predetermined pressure in the accumulator 558. At this time, the ports 580b and 580d communicate with each other, so that the hydraulic oil in the chamber 507 of the actuator 470 is discharged into the drain tank 536 through the control valve 580. Accordingly, the piston 483 moves to the left as viewed on the sheet of paper of FIG. 24 so that its actual stroke amount D becomes equal to the standard required stroke amount D2, and the compression arm 60 is pushed out through the connecting bracket 480 so that its displacement amount corresponds to the standard required stroke amount D2.

On the other hand, in the case where the stroke deviation $\Delta_D$ is negative ($\Delta_D$<0) and hence the driving signal S2 is supplied, the respective positions of the control valves 580 and 581 are shifted to the position designated by symbol IV. In this position, the ports 580a and 580d communicate with each other, and the ports 581a and 581d communicate with each other. In connection with the front-right wheel, the hydraulic oil in the accumulator 558 is fed into the chamber 507 of the actuator 470, and the piston 483 is pushed, under the predetermined pressure from the accumulator 558, to the right as viewed on the sheet of paper of FIG. 24. At this time, the ports 580b and 580c communicate with each other, so that the hydraulic oil in the chamber 506 of the actuator 470 is discharged into the drain tank 536. Accordingly, the piston 483 moves to the right as viewed on the sheet of paper of FIG. 24 so that its actual stroke amount D becomes equal to the standard required stroke amount D2. Thus, the compression arm 60 is pushed back through the connecting bracket 480 so that its displacement amount corresponds to the standard required stroke amount D2.

When the actual stroke amount D becomes equal to the standard required stroke amount D2, the supply of the driving signal S1 or S2 is stopped, as mentioned before, and the respective positions of the control valves 580 and 581 are restored to the position designated by symbol III. Thereupon, the actual stroke amount D of the piston 483 is kept at the standard required stroke amount D2, and the compression arm 60 is kept at a displacement position corresponding to the standard required stroke amount D2.

When the displacement amount or displacement position of the compression arm 60 is controlled in this manner, the lateral arm 31 swings around the rubber bush 34 serving as fulcrum, whereupon the wheel 1 is situated at the position (standard position) indicated by solid line in FIG. 23. At this time, the caster angle of the wheel 1 is kept at 4°, for example. The caster angle of 4° is a value generally used in vehicles. In the medium-speed traveling mode, therefore, a normal traveling state can be established with well-balanced straight traveling stability and steering performance.

At the Time of High-Speed Traveling:

If the ECU 600, receiving a signal from the vehicle velocity sensor 610, concludes that the vehicle velocity V is equal to or greater than the predetermined value V1, it supplies the driving signal S1 to the control valves 580 and 581 in accordance with the difference ($\Delta_D$=D1−D) between the maximum required stroke amount D1 and the actual stroke amount D. Thereupon, the respective positions of the control valves 580 and 581 are switchingly controlled in the aforesaid manner, and the compression arm 60 is pushed out. As a result, the lateral arm 31 swings forward in the vehicle traveling direction around the rubber bush 34 serving as fulcrum, and the wheel 1 is displaced by a displacement amount $\Delta S_F$ from a standard position indicated by solid line in FIG. 23 to a position indicated by broken line. This displacement amount $\Delta S_F$ is a value corresponding to the required stroke amount D1, and is at 40 mm, for example.

Thus, during the high-speed traveling, the wheel base is longer than that at the time of the medium-speed traveling, and the caster angle is as large as, e.g., 7°, so that the straight traveling stability of the vehicle is improved, and the traveling can be secured.

Although an illustration is omitted, the wheel 1 is attached to the knuckle 22 with a camber angle. In the case where the wheel 1 is an outside wheel in a turn, with the caster angle increased to 7°, for example, the wheel 1 is substantially perpendicular to the ground when the steering wheel is operated for steering, so that the turning performance is improved.

At the Time of Low-Speed Traveling:

If it is concluded that the vehicle velocity V is lower than the predetermined value V1 (V<V1) and hence the vehicle is traveling at low speed, the ECU 600 supplies the driving signal S2 to the control valves 580 and 581 in accordance with the difference ($\Delta_D$=D3−D) between the minimum required stroke amount D3 and the actual stroke amount D. Thereupon, the respective positions of the control valves 580 and 581 are switched in the aforesaid manner, and the compression arm 60 is drawn in toward the actuator 470. As a result, the lateral arm 31 swings rearward in the vehicle traveling direction around the rubber bush 34 serving as fulcrum, and the wheel 1 is displaced by a displacement amount $\Delta S_R$ from the standard position (solid line) to a position indicated by one-dotted chain line in FIG. 23. This displacement amount $\Delta S_R$ is a value corresponding to the required stroke amount D3.

Thus, during the low-speed traveling, the wheel base is shorter than that at the time of medium-speed traveling, and the caster angle is as small as, e.g., 2°. In the case where the vehicle is traveling on a winding road or the like at low speed, therefore, the operation of the steering wheel becomes lighter, so that the steering performance is improved. Thus, secure satisfactory turning can be accomplished.

In any of the aforesaid traveling modes, low-speed, medium-speed, and high-speed, the actual stroke amount D is detected continually by the stroke sensors 510 and 511, whereby the actual stroke amount D is feedback-controlled so that it is always equal to the required stroke amount D1, D2 or D3, that is, the stroke deviation $\Delta_D$ is zero.

At the Time of Straight Traveling:

In the case where the vehicle velocity V is in a medium- or low-speed region (V<V2), with the value of the steering wheel angle θ smaller than the predetermined value $\theta_1$ (θ<$\theta_1$) and with the lateral acceleration $G_Y$ and the longitudinal acceleration $G_X$ lower than predetermined values $G_{Y1}$ and $G_{X1}$, respectively ($G_Y$<$G_{Y1}$, $G_{X1}$<$G_{X1}$), that is, when the vehicle is traveling straight at medium or low speed, the communication valves 598 and 599 are supplied with the valve-opening signal, to be opened.

When the communication valves 598 and 599 are opened, the circulation of the hydraulic oil between the chambers 506 and 507 through the lines 596 and 597 is allowed even in the case where the control valves 580 and 581 are in the position designated by symbol III without any supply or discharge of the hydraulic oil.

When the hydraulic oil starts to reciprocate between the chambers 506 and 507 in this manner, the actuator 470 serves as a damper with a small damping force. In the case where a longitudinal force acts on the wheel 1, longitudinal vibration of the wheel 1 caused by this force can be absorbed satisfactorily, so that the traveling stability of the vehicle is improved.

In the case where the vehicle velocity V falls within a high-speed region, the communication valves 598 and 599 are closed to enhance the damping force, thereby preventing shimmy and the like.

At the Time of Turning:

In the case where the value of the steering wheel angle $\theta$ is equal to or larger than the predetermined value $\theta_1$ ($\theta \geq \theta_1$), or if the value of the lateral acceleration $G_Y$ is equal to or greater than the predetermined value $G_{Y1}$ ($G_Y \geq G_{Y1}$), or if the longitudinal acceleration $G_X$ is equal to or greater than the predetermined value $G_{X1}$ ($G_X \geq G_{X1}$), that is, when the vehicle is turning, the communication valves 598 and 599 are supplied with the valve-closing signal, to be closed.

Thereupon, the circulation of the hydraulic oil between the chambers 506 and 507 is interrupted to enhance the damping force, so that the actuator 470 is equivalently rendered to be a rigid body. Accordingly, the wheel 1 can be held satisfactorily without shifting its position in the longitudinal direction. Thus, a cornering force (turning force) acts properly on the vehicle to ensure satisfactory turning without making the wheel 1 shaky, so that the traveling stability of the turning vehicle can be secured.

According to the suspension apparatus of the present invention, as described in detail herein, the caster angle of the front wheels can be suitably changed to effect alignment control with use of a compact construction, depending on the traveling state of the vehicle, without making the mechanism large-sized, or making the space of the engine room unavailable, or increasing the unsprung weight. Thus, when the vehicle is traveling at high speed, the straight traveling stability of the vehicle can be improved satisfactorily by easily increasing the caster angle with good controllability and by lengthening the wheel base. When the vehicle is traveling at low speed, on the other hand, the steering performance of the vehicle is given priority by easily reducing the caster angle and by shortening the wheel base.

Further, the suspension apparatus of the present invention can be easily constructed by slightly modifying the construction of the mounting portion of the actuator 470 alone, without changing the conventional construction of the mounting point of the lateral arm 31. Accordingly, the conventional vehicle body construction can be diverted for use with the suspension apparatus of the present invention, so that the production cost can be reduced.

Moreover, the center of swinging motion between the compression arm 60 and the lateral arm 31 is situated on the extension of the axis Y of the piston 483 of the actuator 470, and the rubber bush 468 is used at the junction between the actuator 470 and the compression arm 60, so that any forces acting on the actuator 470 other than one exerting in the sliding direction of the piston 483 can be securely eliminated by utilizing the elastic effect of rubber. Thus, there is no possibility of any undue force acting on the actuator 470, so that the actuator 470 can enjoy satisfactory durability. In case of any trouble in the actuator 470, the actuator 470, small-sized, exhibits very high maintenance properties such as replaceability.

When the wheel 1 is displaced in the vertical direction of the vehicle, the lateral arm 31 swings around the bolt 35 serving as fulcrum and extending through the mounting brackets 3, 3 and the compression arm 60 swings around the bolt 484 serving as fulcrum and attached to the actuator RH470 in the direction different from the swinging direction of the lateral arm 31. As a result, the junction between the lateral arm 31 and the compression arm 60 is twisted. According to the embodiments described above, however, the rubber bush 64 is used at this junction, so that the rubber bush 64 absorbs the twist satisfactorily, thereby allowing the wheel 1 to be displace vertically. Thus, the strut-type suspension 10 can fulfill its function as a suspension without damage.

Although the rubber bush 64 is used at the junction between the lateral arm 31 and the compression arm 60 to permit the swinging motion in the foregoing embodiments, a ball joint may be used in place of the rubber bush 64 with the same effect.

According to the foregoing embodiments, moreover, the variable rigidity control with quite the same contents is carried out for both front-right and front-left wheels. Alternatively, the hydraulic control unit may be divided to be used for the front-right and front-left wheels so that the front wheels on the right and left sides can be controlled independently of each other.

INDUSTRIAL APPLICABILITY

According to the strut-type suspension apparatus of the present invention, as described above, the individual arms, the lateral arm and the compression arm, can bear their respective shares of the input force on the vehicle body in appropriate directions, so that the change in the toe angle of the wheel can be lessened. According to the lower arm of this type, the input force on the vehicle body is properly absorbed by appropriately setting the rigidity of a support member for the lateral arm and the compression arm, and the caster angle of the wheel is properly adjusted by moving the compression arm by means of the actuator, whereby the traveling stability of the vehicle can be improved.

We claim:

1. A strut-type suspension apparatus for a vehicle, comprising:

a hub carrier for supporting a wheel; and a lower arm for supporting said hub carrier to a vehicle body, said lower arm includes, a lateral arm having one end thereof swingably connected to the hub carrier and another end thereof connected to the vehicle body so as to be swingable in a vertical direction of the vehicle body, and a compression arm having one end thereof swingably connected at a first junction to said lateral arm and another end thereof connected to the vehicle body at a second junction through a first bush having an adjustable rigidity in accordance with a driving condition of the vehicle,, said second junction being separated from a vehicle-body-side junction of said lateral arm in a longitudinal direction of the vehicle body.

2. A strut-type suspension apparatus for a vehicle according to claim 1, wherein said first bush includes a support shaft disposed so as to be substantially perpendicular, at said second junction, to a straight line connecting said first and second junctions, an elastic body provided surrounding said support shaft, a first fluid chamber and a second fluid chamber arranged in said elastic body facing each other across said support shaft on said straight line and filled with fluid, and a restriction passage through which said first and second fluid chambers are permitted to communicate with each other.

3. A strut-type suspension apparatus for a vehicle according to claim 2, wherein said first bush includes damping force regulating means for regulating a damping force by changing restriction of said restriction passage.

4. A strut-type suspension apparatus for a vehicle according to claim 3, wherein said damping force regulating means changes the restriction of said restriction passage in accordance with a state variable of the vehicle detected by state variable detecting means.

5. A strut-type suspension apparatus for a vehicle according to claim 2, wherein said another end of said lateral arm is swingably connected to the vehicle body through an elastic second bush, and wherein at least a spring constant of said second bush in a transverse direction of the vehicle is set to minimize a displacement of said one end of said lateral arm in the transverse direction of the vehicle caused when said lateral arm swings as a force exerting in the longitudinal direction of the vehicle acts on the wheel.

6. A strut-type suspension apparatus for a vehicle according to claim 5, wherein the spring constant is set according to a first operational expression represented as a function of that component of the force acting in the longitudinal direction of the vehicle taken in an axial direction of said lateral arm and a reciprocal of an amount of that displacement of the one end of said lateral arm in the transverse direction of the vehicle caused when only a swinging motion of said lateral arm occurs.

7. A strut-type suspension apparatus for a vehicle according to claim 2, wherein the wheel (1) is a steered wheel, a tie rod, having one end thereof swingably connected to said hub carrier and another end thereof connected to a steering device side and adapted to steer the steered wheel as the steering device is actuated is provided in parallel with said lateral arm, said another end of said lateral arm is swingably connected to the vehicle body through an elastic second bush, and at least a spring constant of said second bush in the transverse direction of the vehicle is set to minimize a change of a toe angle of the wheel caused when said lateral arm swings as a force exerting in the longitudinal direction of the vehicle acts on the wheel.

8. A strut-type suspension apparatus for a vehicle according to claim 7, wherein the spring constant of said second bush in the transverse direction of the vehicle is set according to a second operational expression represented as a function of that component of the force exerting in the longitudinal direction of the vehicle taken in the axial direction of said lateral arm and a reciprocal of a value obtained by subtracting an amount of displacement of said another end of said tie rod, caused when said tie rod is swung by an effect of the force exerting in the longitudinal direction of the vehicle, from an amount of that displacement of said one end of said lateral arm in the transverse direction of the vehicle caused when only a swinging motion of said lateral arm occurs.

9. A strut-type suspension apparatus for a vehicle according to claim 2, wherein said wheel is a steered wheel, a tie rod, having one end thereof swingably connected to said hub carrier and another end thereof connected to a steering device side and adapted to steer the steered wheel as the steering device is actuated is provided in parallel with said lateral arm, another end of said lateral arm is swingably connected to the vehicle body through an elastic second bush, and at least a spring constant of said second bush (34) in the transverse direction of the vehicle is set so as to minimize that displacement of the one end of said lateral arm (31) in the transverse direction of the vehicle which is caused when said lateral arm (31) and said tie rod (28) swing as a force exerting in the longitudinal direction of the vehicle acts on the wheel, and to minimize a change of a toe angle of the wheel.

10. A strut-type suspension apparatus for a vehicle according to claim 9, wherein the spring constant of said second bush in the transverse direction of the vehicle is set at an intermediate value between a first spring constant value and a second spring constant value, the first spring constant value being calculated according to a first operational expression represented as a function of that component of the force exerting in the longitudinal direction of the vehicle taken in an axial direction of said lateral arm and a reciprocal of an amount of that displacement of the one end of said lateral arm in the transverse direction of the vehicle which is caused when only a swinging motion of said lateral arm occurs, said second spring constant value being calculated according to a second operational expression represented as a function of that component of the force in the longitudinal direction of the vehicle taken in an axial direction of said lateral arm and a reciprocal of a value obtained by subtracting an amount of that displacement of said another end of said tie rod caused when said tie rod is swung by an effect of the force exerting in the longitudinal direction of the vehicle, from an amount of that displacement of the one end of said lateral arm in the transverse direction of the vehicle caused when only a swinging motion of said lateral arm occurs.

11. A strut-type suspension apparatus for a vehicle according to claim 3, wherein the wheel is a steered wheel, a tie rod, having one end thereof swingably connected to said hub carrier and another end thereof connected to a steering device side and adapted to steer the steered wheel as the steering device is actuated, is provided in parallel with said lateral arm, said another end of said lateral arm is swingably connected to the vehicle body through an elastic second bush, and at least a spring constant of said second bush in the transverse direction of the vehicle is set as to minimize a change of a toe angle of the wheel caused when said lateral arm swings as a force exerting in the longitudinal direction of the vehicle acts on the wheel.

12. A strut-type suspension apparatus for a vehicle according to claim 4, wherein the wheel is a steered wheel, a tie rod having one end thereof swingably connected to said hub carrier and another end thereof connected to a steering device side and adapted to steer the steered wheel as the steering device is actuated, is provided in parallel with said lateral arm, said another end of said lateral arm is swingably connected to the vehicle body through an elastic second bush, and at least a spring constant of said second bush in the transverse direction of the vehicle is set to minimize a change of a toe angle of the wheel caused when said lateral arm swings as a force exerting in the longitudinal direction of the vehicle acts on the wheel.

13. A strut-type suspension apparatus for a vehicle according to claim 3, wherein said wheel is a steered wheel,
   a tie rod, having one end thereof swingably connected to said hub carrier and another end thereof connected to a steering device side and adapted to steer the steered wheel as the steering device is actuated, is provided in parallel with said lateral arm,
   another end of said lateral arm is swingably connected to the vehicle body through an elastic second bush, and
   at least a spring constant of said second bush in the transverse direction of the vehicle is set to minimize that displacement of the one end of said lateral arm in the transverse direction of the vehicle caused when said lateral arm and said tie rod swing as a force exerting in the longitudinal direction of the vehicle acts on the wheel, and to minimize a change of a toe angle of the wheel.

14. A strut-type suspension apparatus for a vehicle according to claim 4, wherein said wheel is a steered wheel,
   a tie rod, having one end thereof swingably connected to said hub carrier and another end thereof connected to a steering device side and adapted to steer the steered wheel as the steering device is actuated, is provided in parallel with said lateral arm,
   another end of said lateral arm is swingably connected to the vehicle body through an elastic second bush, and
   at least a spring constant of said second bush in the transverse direction of the vehicle is set to minimize that displacement of the one end of said lateral arm in the transverse direction of the vehicle caused when said lateral arm and said tie rod swing as a force exerting in the longitudinal direction of the vehicle acts on the wheel, and to minimize a change of a toe angle of the wheel.

15. A strut-type suspension apparatus for a vehicle according to claim 3, wherein said another end of said lateral arm is swingably connected to the vehicle body through an elastic second rubber bush, and
   wherein at least a spring constant of said second bush in a transverse direction of the vehicle is set to minimize a displacement of said one end of said lateral arm in the transverse direction of the vehicle caused when said lateral arm swings as a force exerting in the longitudinal direction of the vehicle acts on the wheel.

16. A strut-type suspension apparatus for a vehicle according to claim 4, wherein said another end of said lateral arm is swingably connected to the vehicle body through an elastic second bush, and
   wherein at least a spring constant of said second bush in a transverse direction of the vehicle is set to minimize a displacement of said one end of said lateral arm in the transverse direction of the vehicle caused when said lateral arm (31) swings as a force exerting in the longitudinal direction of the vehicle acts on the wheel.

17. A strut-type suspension apparatus for a vehicle according to claim 1, wherein said hub carrier is also supported to the vehicle body by a strut.

18. A strut-type suspension apparatus for a vehicle according to claim 1, wherein said compression arm is swingably connected to said lateral arm via a resilient bush.

19. A strut-type suspension apparatus for a vehicle according to claim 1, wherein said first junction is provided at a hub-carrier-side end portion of said lateral arm.

20. A strut-type suspension apparatus for a vehicle, comprising:
   a hub carrier for supporting a wheel; and
   a lower arm for supporting said hub carrier to a vehicle body, said lower arm includes,
      a lateral arm having one end thereof swingably connected to the hub carrier and another end thereof connected to the vehicle body so as to be swingable in a vertical direction of the vehicle body, and
      a compression arm having one end thereof swingably connected at a first junction to said lateral arm and another end thereof connected to the vehicle body through an actuator displaceable along a straight line connecting the first and second junctions, said second junction being separated from a vehicle-body-side junction of said lateral arm in a longitudinal direction of the vehicle body.

21. A strut-type suspension apparatus for a vehicle according to claim 20, wherein said actuator includes a piston having a connecting bracket connected to said second junction, a cylinder divided into two fluid chambers by said piston; and liquid pressure supply means for reciprocating said piston by supplying and discharging fluid to and from said two fluid chambers.

22. A strut-type suspension apparatus for a vehicle according to claim 21, wherein said actuator controls said liquid pressure supply means in accordance with a state variable of the vehicle detected by state variable detecting means, and adjust a caster angle of the wheel by displacing said another end of said compression arm along the straight line connecting said first and second junctions.

23. A strut-type suspension apparatus for a vehicle according to claim 22, wherein said state variable detecting means includes at least one of detecting means including vehicle velocity detecting means for detecting a vehicle velocity, steering angle detecting means for detecting a steering angle, lateral acceleration detecting means for detecting a lateral acceleration acting on the vehicle, and longitudinal acceleration detecting means for detecting a longitudinal acceleration acting on the vehicle.

24. A strut-type suspension apparatus for a vehicle according to claim 20, wherein said hub carrier is also supported to the vehicle body by a strut.

25. A strut-type suspension apparatus for a vehicle according to claim 20, wherein said compression arm is swingably connected to said lateral arm via a resilient bush.

26. A strut-type suspension apparatus for a vehicle according to claim 20, wherein said first junction is provided at a hub-carrier-side end portion of said lateral arm.

* * * * *